US012559132B2

(12) United States Patent
Johnson et al.

(10) Patent No.: US 12,559,132 B2
(45) Date of Patent: *Feb. 24, 2026

(54) METHOD AND SYSTEM FOR CONDITIONAL OPERATION OF AN AUTONOMOUS AGENT

(71) Applicant: May Mobility, Inc., Ann Arbor, MI (US)

(72) Inventors: Collin Johnson, Ann Arbor, MI (US); Alexander Cunningham, Ann Arbor, MI (US); Timothy Saucer, Ann Arbor, MI (US); Edwin B. Olson, Ann Arbor, MI (US)

(73) Assignee: May Mobility, Inc., Ann Arbor, MI (US)

( * ) Notice: Subject to any disclaimer, the term of this patent is extended or adjusted under 35 U.S.C. 154(b) by 171 days.

This patent is subject to a terminal disclaimer.

(21) Appl. No.: 18/378,911

(22) Filed: Oct. 11, 2023

(65) Prior Publication Data

US 2024/0043034 A1      Feb. 8, 2024

Related U.S. Application Data

(63) Continuation of application No. 18/109,689, filed on Feb. 14, 2023, now Pat. No. 11,814,072.

(60) Provisional application No. 63/309,945, filed on Feb. 14, 2022.

(51) Int. Cl.
*B60W 60/00* (2020.01)

(52) U.S. Cl.
CPC ....... *B60W 60/001* (2020.02); *B60W 2552/05* (2020.02); *B60W 2552/53* (2020.02); *B60W 2554/4046* (2020.02); *B60W 2556/40* (2020.02)

(58) Field of Classification Search
None
See application file for complete search history.

(56) References Cited

U.S. PATENT DOCUMENTS

| | | | |
|---|---|---|---|
| 5,544,282 A | 8/1996 | Chen et al. | |
| 6,199,013 B1 | 3/2001 | Oshea | |
| 8,949,016 B1 | 2/2015 | Ferguson et al. | |
| (Continued) | | | |

FOREIGN PATENT DOCUMENTS

| | | |
|---|---|---|
| JP | 2011100492 A | 5/2011 |
| JP | 2015083417 A | 4/2015 |
| (Continued) | | |

OTHER PUBLICATIONS

Crossman, Jacob , et al., "Method and System for Assessing and Mitigating Risks Encounterable by an Autonomous Vehicle", U.S. Appl. No. 18/538,312, filed Dec. 13, 2023.

(Continued)

*Primary Examiner* — Anshul Sood
(74) *Attorney, Agent, or Firm* — Buckley Maschoff & Takalkar LLC

(57) ABSTRACT

A method for conditional operation of an autonomous agent includes: collecting a set of inputs; processing the set of inputs; determining a set of policies for the agent; evaluating the set of policies; and operating the ego agent. A system for conditional operation of an autonomous agent includes a set of computing subsystems (equivalently referred to herein as a set of computers) and/or processing subsystems (equivalently referred to herein as a set of processors), which function to implement any or all of the processes of the method.

20 Claims, 12 Drawing Sheets

(56) References Cited

U.S. PATENT DOCUMENTS

| | | | |
|---|---|---|---|
| 9,129,519 | B2 | 9/2015 | Aoude et al. |
| 9,274,525 | B1 | 3/2016 | Ferguson et al. |
| 9,368,026 | B1 | 6/2016 | Herbach et al. |
| 9,495,874 | B1 | 11/2016 | Zhu et al. |
| 9,618,938 | B2 | 4/2017 | Olson et al. |
| 9,646,428 | B1 | 5/2017 | Konrardy et al. |
| 9,720,412 | B1 | 8/2017 | Zhu et al. |
| 9,811,760 | B2 | 11/2017 | Richardson et al. |
| 9,914,452 | B1 | 3/2018 | Ferguson et al. |
| 10,012,981 | B2 | 7/2018 | Gariepy et al. |
| 10,062,294 | B2 | 8/2018 | Kunzi et al. |
| 10,156,848 | B1 | 12/2018 | Konrardy et al. |
| 10,223,479 | B1 | 3/2019 | Konrardy et al. |
| 10,235,882 | B1 | 3/2019 | Aoude et al. |
| 10,248,120 | B1 | 4/2019 | Siegel et al. |
| 10,386,856 | B2 | 8/2019 | Wood et al. |
| 10,467,891 | B1 | 11/2019 | Bart et al. |
| 10,518,770 | B2 | 12/2019 | Kroop et al. |
| 10,518,783 | B2 | 12/2019 | Tanimichi et al. |
| 10,540,892 | B1 | 1/2020 | Fields et al. |
| 10,558,224 | B1 | 2/2020 | Lin et al. |
| 10,564,641 | B2 | 2/2020 | Vozar et al. |
| 10,564,643 | B2 | 2/2020 | Lui et al. |
| 10,571,916 | B2 | 2/2020 | Tschanz et al. |
| 10,586,254 | B2 | 3/2020 | Singhal |
| 10,599,155 | B1 | 3/2020 | Konrardy et al. |
| 10,614,709 | B2 | 4/2020 | Vozar et al. |
| 10,642,276 | B2 | 5/2020 | Huai |
| 10,654,476 | B2 | 5/2020 | Wray et al. |
| 10,671,076 | B1 | 6/2020 | Kobilarov et al. |
| 10,796,581 | B2 | 10/2020 | Herbach et al. |
| 10,860,019 | B2 | 12/2020 | Censi et al. |
| 10,969,470 | B2 | 4/2021 | Voorheis et al. |
| 11,003,916 | B2 | 5/2021 | Hummelshøj |
| 11,086,318 | B1 | 8/2021 | Davis et al. |
| 11,087,200 | B2 | 8/2021 | Olson et al. |
| 11,242,054 | B2 | 2/2022 | Isele |
| 11,260,855 | B2 | 3/2022 | Zhang |
| 11,269,332 | B2 | 3/2022 | Vozar et al. |
| 11,281,213 | B2 | 3/2022 | Cross et al. |
| 11,300,957 | B2 | 4/2022 | Wray et al. |
| 11,352,023 | B2 | 6/2022 | Fairley et al. |
| 11,380,108 | B1 | 7/2022 | Cai et al. |
| 11,396,302 | B2 | 7/2022 | Ye et al. |
| 11,472,436 | B1 | 10/2022 | Patel et al. |
| 11,472,444 | B2 | 10/2022 | Goeddel et al. |
| 11,554,793 | B2 | 1/2023 | Han et al. |
| 11,565,717 | B2 | 1/2023 | Kothbauer et al. |
| 11,748,085 | B2 | 9/2023 | Fields et al. |
| 2002/0062207 | A1 | 5/2002 | Faghri |
| 2004/0100563 | A1 | 5/2004 | Sablak et al. |
| 2005/0004723 | A1 | 1/2005 | Duggan et al. |
| 2006/0184275 | A1 | 8/2006 | Hosokawa et al. |
| 2006/0200333 | A1 | 9/2006 | Dalal et al. |
| 2007/0193798 | A1 | 8/2007 | Allard et al. |
| 2007/0276600 | A1 | 11/2007 | King et al. |
| 2008/0033684 | A1 | 2/2008 | Vian et al. |
| 2010/0114554 | A1 | 5/2010 | Misra |
| 2010/0204867 | A1 | 8/2010 | Longstaff |
| 2010/0228419 | A1 | 9/2010 | Lee et al. |
| 2011/0142283 | A1 | 6/2011 | Huang et al. |
| 2012/0089275 | A1 | 4/2012 | Yao-Chang et al. |
| 2013/0054106 | A1 | 2/2013 | Schmuedderich et al. |
| 2013/0141576 | A1 | 6/2013 | Lord et al. |
| 2013/0253816 | A1 | 9/2013 | Caminiti et al. |
| 2014/0195138 | A1 | 7/2014 | Stelzig et al. |
| 2014/0244198 | A1 | 8/2014 | Mayer |
| 2014/0277835 | A1 | 9/2014 | Filev et al. |
| 2014/0309815 | A1 | 10/2014 | Ricci et al. |
| 2015/0105961 | A1 | 4/2015 | Callow |
| 2015/0284010 | A1 | 10/2015 | Beardsley et al. |
| 2015/0302756 | A1 | 10/2015 | Guehring et al. |
| 2015/0316928 | A1 | 11/2015 | Guehring et al. |
| 2015/0321337 | A1 | 11/2015 | Stephens |
| 2015/0344030 | A1 | 12/2015 | Damerow et al. |
| 2016/0005333 | A1 | 1/2016 | Naouri |
| 2016/0209840 | A1 | 7/2016 | Kim |
| 2016/0314224 | A1 | 10/2016 | Wei et al. |
| 2017/0031361 | A1 | 2/2017 | Olson et al. |
| 2017/0032671 | A1 | 2/2017 | Toyama et al. |
| 2017/0072853 | A1 | 3/2017 | Matsuoka et al. |
| 2017/0123419 | A1 | 5/2017 | Levinson et al. |
| 2017/0155696 | A1 | 6/2017 | Dong et al. |
| 2017/0192426 | A1 | 7/2017 | Rust |
| 2017/0199523 | A1 | 7/2017 | Barton-Sweeney et al. |
| 2017/0268896 | A1 | 9/2017 | Bai et al. |
| 2017/0289341 | A1 | 10/2017 | Rodriguez et al. |
| 2017/0291560 | A1 | 10/2017 | Schroeder et al. |
| 2017/0291602 | A1 | 10/2017 | Newman et al. |
| 2017/0301111 | A1 | 10/2017 | Zhao et al. |
| 2017/0320500 | A1 | 11/2017 | Yoo et al. |
| 2017/0323568 | A1 | 11/2017 | Inoue et al. |
| 2017/0356748 | A1 | 12/2017 | Iagnemma |
| 2018/0011485 | A1 | 1/2018 | Ferren |
| 2018/0046182 | A1 | 2/2018 | Joyce et al. |
| 2018/0047291 | A1 | 2/2018 | Konishi et al. |
| 2018/0053102 | A1 | 2/2018 | Martinson et al. |
| 2018/0065625 | A1 | 3/2018 | Tijerina et al. |
| 2018/0070056 | A1 | 3/2018 | Deangelis et al. |
| 2018/0082596 | A1 | 3/2018 | Whitlow |
| 2018/0089563 | A1 | 3/2018 | Redding et al. |
| 2018/0100743 | A1 | 4/2018 | Diaz et al. |
| 2018/0183873 | A1 | 6/2018 | Wang et al. |
| 2018/0184352 | A1 | 6/2018 | Lopes et al. |
| 2018/0196427 | A1 | 7/2018 | Majumdar et al. |
| 2018/0220283 | A1 | 8/2018 | Condeixa et al. |
| 2018/0224851 | A1 | 8/2018 | Park |
| 2018/0251126 | A1 | 9/2018 | Linscott et al. |
| 2018/0267550 | A1 | 9/2018 | Kopetz et al. |
| 2018/0268281 | A1 | 9/2018 | Olson et al. |
| 2018/0281815 | A1 | 10/2018 | Stentz |
| 2018/0293537 | A1 | 10/2018 | Kwok |
| 2018/0299898 | A1 | 10/2018 | Luo et al. |
| 2018/0330481 | A1 | 11/2018 | Watanabe et al. |
| 2018/0365908 | A1 | 12/2018 | Liu et al. |
| 2018/0367997 | A1 | 12/2018 | Shaw et al. |
| 2019/0027034 | A1 | 1/2019 | Xu et al. |
| 2019/0039545 | A1 | 2/2019 | Kumar et al. |
| 2019/0042859 | A1 | 2/2019 | Schubert et al. |
| 2019/0066399 | A1 | 2/2019 | Jiang et al. |
| 2019/0096244 | A1 | 3/2019 | Guruva Reddiar et al. |
| 2019/0101914 | A1 | 4/2019 | Coleman et al. |
| 2019/0101919 | A1 | 4/2019 | Kobilarov et al. |
| 2019/0106117 | A1 | 4/2019 | Goldberg |
| 2019/0113919 | A1 | 4/2019 | England et al. |
| 2019/0113929 | A1 | 4/2019 | Mukadam et al. |
| 2019/0130878 | A1 | 5/2019 | Bradley |
| 2019/0138007 | A1 | 5/2019 | Baghsorkhi et al. |
| 2019/0138524 | A1 | 5/2019 | Singh et al. |
| 2019/0147610 | A1 | 5/2019 | Frossard et al. |
| 2019/0163176 | A1 | 5/2019 | Wang et al. |
| 2019/0180529 | A1 | 6/2019 | Smith |
| 2019/0196465 | A1 | 6/2019 | Hummelshøj |
| 2019/0220011 | A1 | 7/2019 | Della Penna |
| 2019/0227553 | A1 | 7/2019 | Kentley-Klay et al. |
| 2019/0235516 | A1 | 8/2019 | Zhang et al. |
| 2019/0236950 | A1 | 8/2019 | Li et al. |
| 2019/0256096 | A1 | 8/2019 | Graf et al. |
| 2019/0258246 | A1 | 8/2019 | Liu et al. |
| 2019/0258251 | A1 | 8/2019 | Ditty et al. |
| 2019/0265059 | A1 | 8/2019 | Warnick et al. |
| 2019/0271554 | A1 | 9/2019 | Colgate et al. |
| 2019/0271981 | A1 | 9/2019 | Oba |
| 2019/0291726 | A1 | 9/2019 | Shalev-Shwartz et al. |
| 2019/0329771 | A1 | 10/2019 | Wray et al. |
| 2019/0331758 | A1 | 10/2019 | Malkes et al. |
| 2019/0332106 | A1 | 10/2019 | Belloni Mourao et al. |
| 2019/0332110 | A1 | 10/2019 | Isele et al. |
| 2019/0337509 | A1 | 11/2019 | Shalev-Shwartz et al. |
| 2020/0004241 | A1 | 1/2020 | Levinson et al. |
| 2020/0017114 | A1 | 1/2020 | Santoni et al. |
| 2020/0020226 | A1 | 1/2020 | Stenneth et al. |
| 2020/0026286 | A1 | 1/2020 | Vozar et al. |
| 2020/0057441 | A1 | 2/2020 | Wang et al. |

(56) References Cited

U.S. PATENT DOCUMENTS

| | | | |
|---|---|---|---|
| 2020/0086837 A1 | 3/2020 | Le Cornec |
| 2020/0094850 A1 | 3/2020 | Chi et al. |
| 2020/0097003 A1 | 3/2020 | Wray et al. |
| 2020/0098269 A1 | 3/2020 | Wray et al. |
| 2020/0110411 A1 | 4/2020 | Vozar et al. |
| 2020/0122830 A1 | 4/2020 | Anderson et al. |
| 2020/0124447 A1 | 4/2020 | Schwindt et al. |
| 2020/0139973 A1 | 5/2020 | Palanisamy et al. |
| 2020/0150661 A1 | 5/2020 | Vozar et al. |
| 2020/0159227 A1 | 5/2020 | Cohen et al. |
| 2020/0189731 A1 | 6/2020 | Mistry et al. |
| 2020/0209846 A1 | 7/2020 | Chen |
| 2020/0209853 A1 | 7/2020 | Leach et al. |
| 2020/0209864 A1 | 7/2020 | Chen |
| 2020/0233060 A1 | 7/2020 | Lull et al. |
| 2020/0255027 A1 | 8/2020 | Kulkarni et al. |
| 2020/0269843 A1 | 8/2020 | Wissing et al. |
| 2020/0276984 A1 | 9/2020 | Matsumoto et al. |
| 2020/0290619 A1 | 9/2020 | Mehdi et al. |
| 2020/0293038 A1 | 9/2020 | Laurent et al. |
| 2020/0293041 A1 | 9/2020 | Palanisamy |
| 2020/0294401 A1 | 9/2020 | Kerecsen |
| 2020/0298891 A1 | 9/2020 | Liang et al. |
| 2020/0309543 A1 | 10/2020 | Voznesensky |
| 2020/0310417 A1 | 10/2020 | Pedersen et al. |
| 2020/0339151 A1 | 10/2020 | Batts et al. |
| 2020/0346643 A1 | 11/2020 | Woon et al. |
| 2020/0346666 A1 | 11/2020 | Wray et al. |
| 2020/0355820 A1 | 11/2020 | Zeng et al. |
| 2020/0369294 A1 | 11/2020 | Jeon et al. |
| 2020/0379457 A1 | 12/2020 | Ostafew et al. |
| 2020/0400781 A1 | 12/2020 | Voorheis et al. |
| 2020/0401135 A1 | 12/2020 | Chen et al. |
| 2021/0018916 A1 | 1/2021 | Thakur et al. |
| 2021/0042535 A1 | 2/2021 | Abbott et al. |
| 2021/0046924 A1 | 2/2021 | Caldwell et al. |
| 2021/0110484 A1 | 4/2021 | Shalev-Shwartz et al. |
| 2021/0116907 A1 | 4/2021 | Altman |
| 2021/0132606 A1 | 5/2021 | Basich et al. |
| 2021/0163021 A1 | 6/2021 | Frazzoli et al. |
| 2021/0181758 A1 | 6/2021 | Das et al. |
| 2021/0197864 A1 | 7/2021 | Oltmann et al. |
| 2021/0200207 A1 | 7/2021 | Soryal et al. |
| 2021/0208244 A1 | 7/2021 | Voorheis et al. |
| 2021/0229697 A1 | 7/2021 | Lee et al. |
| 2021/0237759 A1 | 8/2021 | Wray et al. |
| 2021/0245785 A1 | 8/2021 | Suzuki et al. |
| 2021/0252715 A1 | 8/2021 | Javidan et al. |
| 2021/0269063 A1 | 9/2021 | Lee et al. |
| 2021/0284183 A1 | 9/2021 | Marenco et al. |
| 2021/0286651 A1 | 9/2021 | Ho et al. |
| 2021/0300412 A1 | 9/2021 | Dingli et al. |
| 2021/0339741 A1 | 11/2021 | Rezvan Behbahani et al. |
| 2021/0365701 A1 | 11/2021 | Eshet et al. |
| 2021/0370980 A1 | 12/2021 | Ramamoorthy et al. |
| 2021/0394757 A1 | 12/2021 | Beller et al. |
| 2022/0001892 A1 | 1/2022 | Fairley et al. |
| 2022/0063674 A1 | 3/2022 | De Francesco et al. |
| 2022/0066440 A1 | 3/2022 | Sucan et al. |
| 2022/0073097 A1 | 3/2022 | Sucan et al. |
| 2022/0076032 A1 | 3/2022 | Jain et al. |
| 2022/0081005 A1 | 3/2022 | Brown et al. |
| 2022/0114406 A1 | 4/2022 | Wyffels |
| 2022/0126878 A1 | 4/2022 | Moustafa et al. |
| 2022/0144306 A1 | 5/2022 | Narang et al. |
| 2022/0161811 A1 | 5/2022 | Lu et al. |
| 2022/0169263 A1 | 6/2022 | Li et al. |
| 2022/0185325 A1 | 6/2022 | Chen et al. |
| 2022/0204010 A1 | 6/2022 | Zhu et al. |
| 2022/0227389 A1 | 7/2022 | Tam |
| 2022/0230080 A1 | 7/2022 | Isele et al. |
| 2022/0317695 A1 | 10/2022 | Wang et al. |
| 2022/0348222 A1 | 11/2022 | Zhao et al. |
| 2022/0348223 A1 | 11/2022 | Zhao et al. |
| 2022/0388547 A1 | 12/2022 | Yangel et al. |
| 2023/0005163 A1 | 1/2023 | Kim |
| 2023/0067887 A1 | 3/2023 | Garg et al. |
| 2023/0166764 A1 | 6/2023 | Johnson et al. |
| 2023/0174103 A1 | 6/2023 | Patel et al. |
| 2023/0192134 A1 | 6/2023 | Winter et al. |
| 2023/0194286 A1 | 6/2023 | Winter et al. |

FOREIGN PATENT DOCUMENTS

| | | | |
|---|---|---|---|
| JP | 2016091039 A | 5/2016 |
| JP | 2016184276 A | 10/2016 |
| JP | 2020140534 A | 9/2020 |
| WO | 2015160900 A1 | 10/2015 |
| WO | 2021231452 A1 | 11/2021 |

OTHER PUBLICATIONS

Cunningham, A. , et al., "MPDM: Multipolicy Decision-Making in Dynamic, Uncertain Environments for Autonomous Driving", Proceedings of the IEEE International Conference on Robotics and Automation (ICRA) (2015).

Galceran, Enric , et al., "Multipolicy Decision-Making for Autonomous Driving via Changepoint-based Behavior Prediction", Proceedings of Robotics: Science and Systems (RSS); Jul. 2015; <https://april.eecs.umich.edu/papers/details.php?name=galceran2015rss> (Year: 2015).

Mehta, D. , et al., "Autonomous Navigation in Dynamic Social Environments Using Multi-Policy Decision Making", Proceedings of the IEEE/RSJ International Conference on Intelligent Robots and Systems (IROS) (2016).

Mehta, D. , et al., "Fast Discovery of Influential Outcomes For Risk-Aware MPDM", Proceedings go the IEEE International Conference on Robotics and Automation (ICRA) (2017).

Neumeier Stefan, et al., "Towards a Driver Support System for Teleoperated Driving", 2019 IEEE Intelligent Transportation Systems Conference (ITSC) (Year: 2019).

Paden, B. , et al., "A Survey of Motion Planning and Control Techniques for Self-driving Urban Vehicles", IEEE Transactions on Intelligent Vehicles, vol. 1, Ids. 1, (Jun. 13, 2016).

Straub, J. , "Comparing The Effect Of Pruning On A Best Path and a Naive-approach Blackboard Solver", International Journal of Automation and Computing (Oct. 2015).

Wuthishuwong, Chairit , et al., "Vehicle to Infrastructure based Safe Trajectory Planning for Autonomous Intersection Management", 2013 13th International Conference on ITS Telecommunications (ITST) (Year: 2013).

100

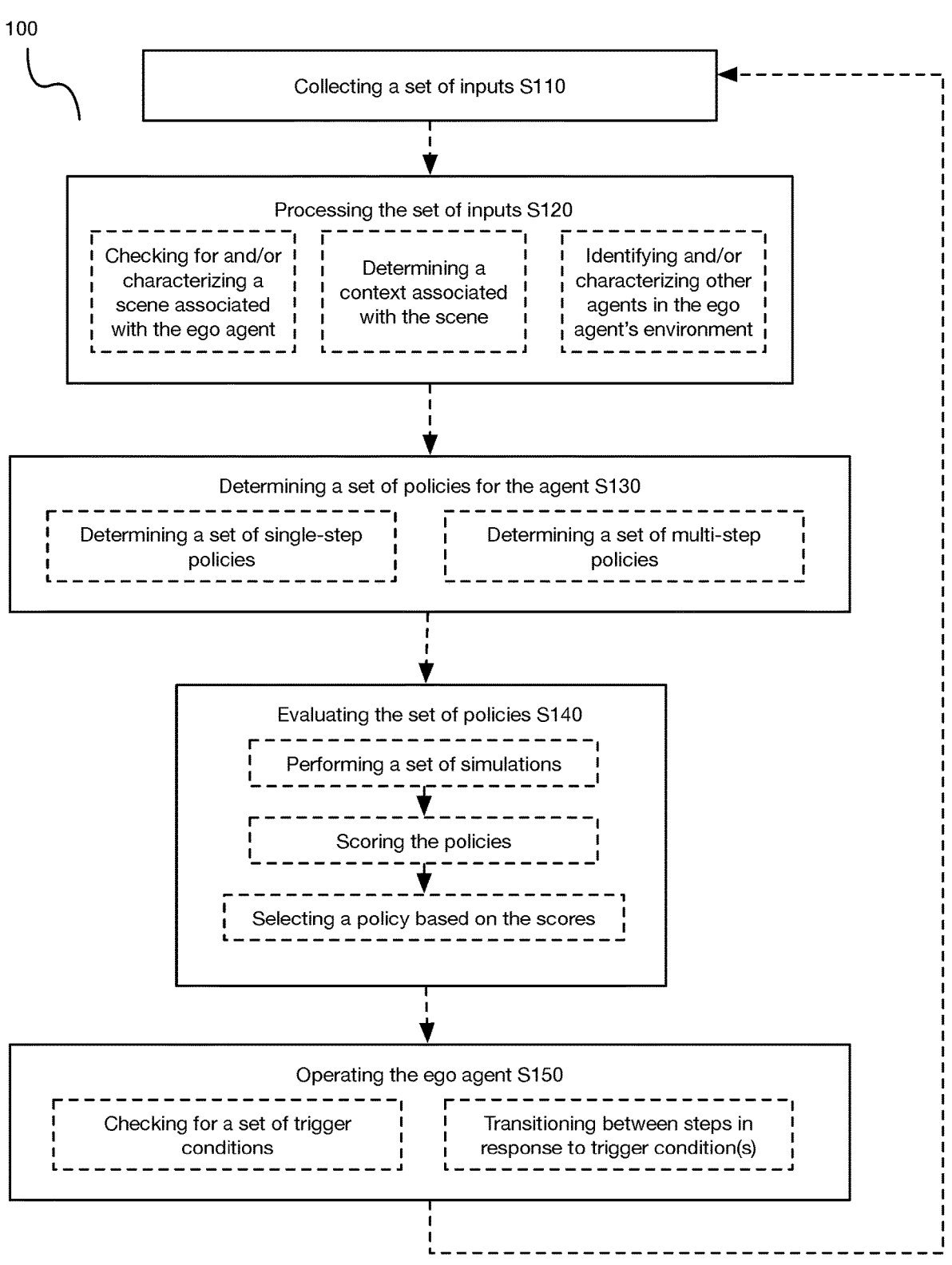

Collecting a set of inputs S110

Processing the set of inputs S120

Checking for and/or characterizing a scene associated with the ego agent

Determining a context associated with the scene

Identifying and/or characterizing other agents in the ego agent's environment

Determining a set of policies for the agent S130

Determining a set of single-step policies

Determining a set of multi-step policies

Evaluating the set of policies S140

Performing a set of simulations

Scoring the policies

Selecting a policy based on the scores

Operating the ego agent S150

Checking for a set of trigger conditions

Transitioning between steps in response to trigger condition(s)

FIGURE 1

Optional identified scenario: Obstruction ahead of vehicle

Scene evaluation result: there is an obstruction
ahead with an associated set of parameters
(e.g., length of obstruction, width of
obstruction, width of lane that obstruction is
occupying, motion information of obstruction,
etc.)

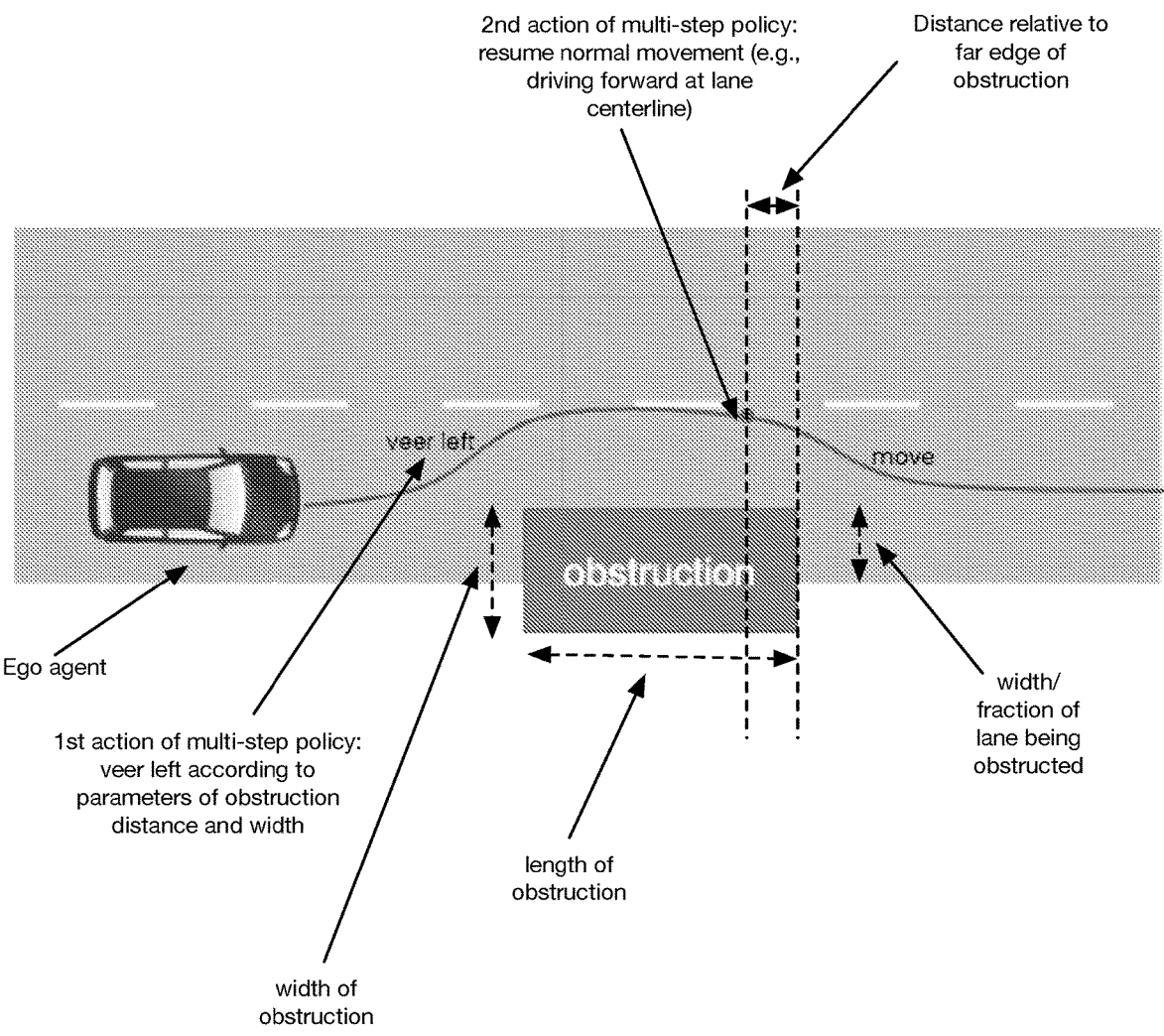

2nd action of multi-step policy:
resume normal movement (e.g.,
driving forward at lane
centerline)

Distance relative to
far edge of
obstruction

Ego agent

1st action of multi-step policy:
veer left according to
parameters of obstruction
distance and width width of
obstruction length of
obstruction width/
fraction of
lane being
obstructed

$t = t_{simulation}$

Simulation at election cycle
of $t = t_1$ $t = t_1$

Option 1 of selected policies at simulations performed at each election time step

| Time | Selected policy from simulation |
|------|---------------------------------|
| $t_1$ | Multi-step policy: Actions 1, 2, and 3 |
| $t_2$ | Multi-step policy: Actions 1, 2, and 3 |
| $t_3$ | Single-step policy: Action 2 |
| $t_4$ | Single-step policy: Action 2 |
| $t_5$ | Single-step policy: Action 2 |
| $t_6$ | Single-step policy: Action 2 |
| $t_7$ | Single-step policy: Action 2 |
| $t_8$ | Single-step policy: Action 2 |
| $t_9$ | Single-step policy: Action 2 |
| $t_{10}$ | Single-step policy: Action 2 |
| $t_{11}$ | Single-step policy: Action 3 |
| $t_{12}$ | Single-step policy: Action 3 |
| $t_{13}$ | Single-step policy: Action 3 |
| $t_{14}$ | Single-step policy: Action 3 |

FIGURE 8E

Option 2 of selected policies at simulations performed at each election time step

| Time | Selected policy from simulation |
|------|--------------------------------|
| $t_1$ | Multi-step policy: Actions 1, 2, and 3 |
| $t_2$ | Multi-step policy: Actions 1, 2, and 3 |
| $t_3$ | Multi-step policy: Actions 2 and 3 |
| $t_4$ | Multi-step policy: Actions 2 and 3 |
| $t_5$ | Multi-step policy: Actions 2 and 3 |
| $t_6$ | Multi-step policy: Actions 2 and 3 |
| $t_7$ | Multi-step policy: Actions 2 and 3 |
| $t_8$ | Multi-step policy: Actions 2 and 3 |
| $t_9$ | Multi-step policy: Actions 2 and 3 |
| $t_{10}$ | Multi-step policy: Actions 2 and 3 |
| $t_{11}$ | Single-step policy: Action 3 |
| $t_{12}$ | Single-step policy: Action 3 |
| $t_{13}$ | Single-step policy: Action 3 |
| $t_{14}$ | Single-step policy: Action 3 |

FIGURE 8F

METHOD AND SYSTEM FOR CONDITIONAL OPERATION OF AN AUTONOMOUS AGENT

CROSS-REFERENCE TO RELATED APPLICATIONS

This application is a continuation of U.S. application Ser. No. 18/109,689, filed 14 Feb. 2023, which claims the benefit of U.S. Provisional Application No. 63/309,945, filed 14 Feb. 2022, which is incorporated herein in its entirety by this reference.

TECHNICAL FIELD

This invention relates generally to the autonomous vehicle field, and more specifically to a new and useful system and method for conditional operation of an autonomous agent in the autonomous vehicle field.

BACKGROUND

Optimizing the decision-making of autonomous vehicles is associated with numerous challenges. One significant challenge is configuring the autonomous vehicle to drive cautiously and minimize risk, yet still be equipped to deal with complex scenarios in a way which mimics human behavior and causes minimal disruption to other drivers on the road. While conventional systems and methods have approached this in numerous ways, it has yet to be achieved and reliably implemented.

Thus, there is a need in the autonomous vehicle field to create an improved and useful system and method for operation of an autonomous agent.

BRIEF DESCRIPTION OF THE FIGURES

FIG. 1 is a schematic of a method for conditional operation of an autonomous agent.

FIG. 6 depicts a third example of the method for conditional operation of an autonomous agent.

FIGS. 8A-8F depict a set of demonstrative examples of a method for conditional operation of an autonomous agent.

DESCRIPTION OF THE PREFERRED EMBODIMENTS

Figure 2:
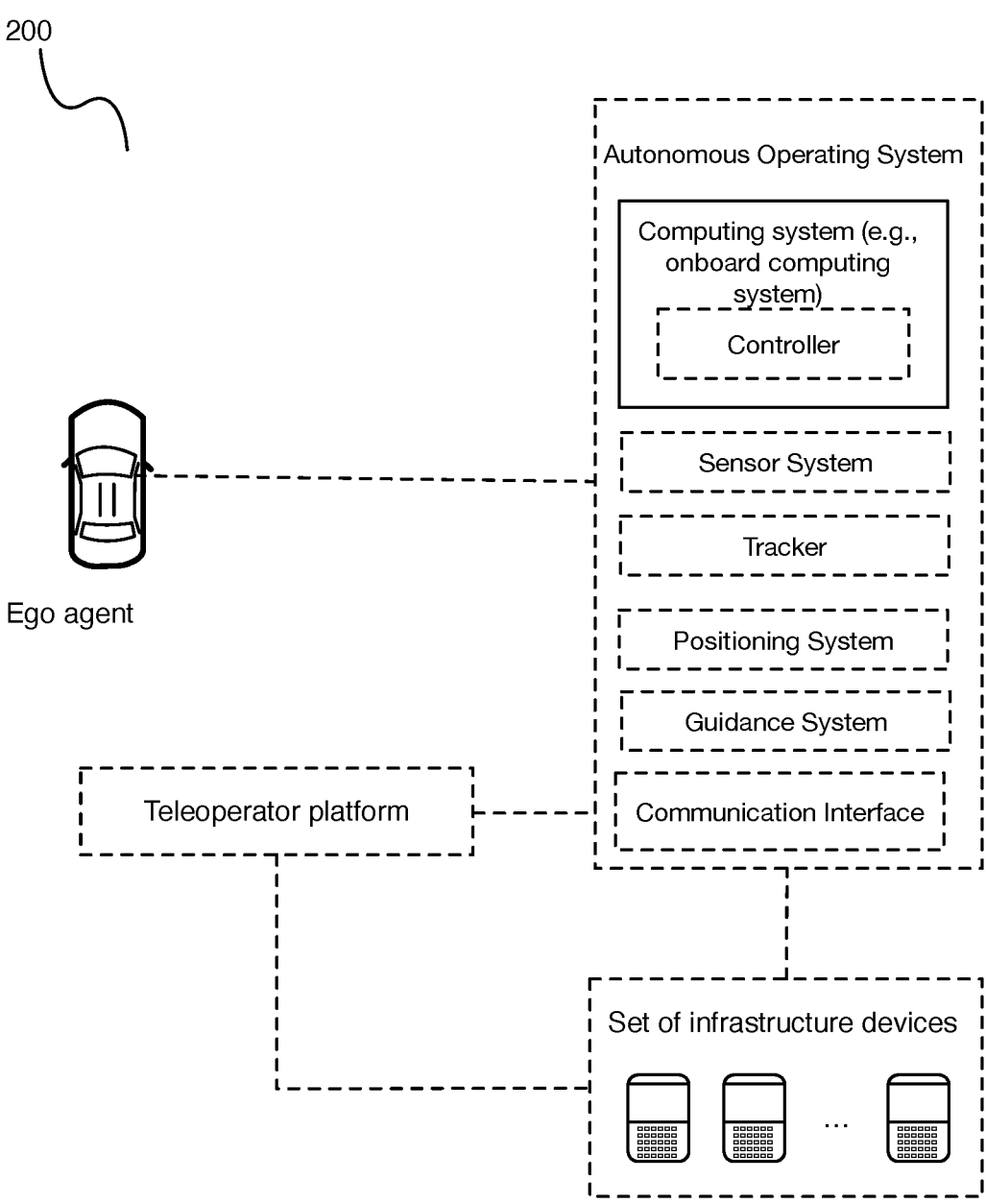
FIG. 2 is a schematic of a system for conditional operation of an autonomous agent.

The following description of the preferred embodiments of the invention is not intended to limit the invention to these preferred embodiments, but rather to enable any person skilled in the art to make and use this invention.

1. Overview

As shown in FIG. 1, a method 100 for conditional operation of an autonomous agent includes: collecting a set of inputs S110; processing the set of inputs S120; determining a set of policies for the agent S130; evaluating the set of policies S140; and operating the ego agent S150. Additionally or alternatively, the method 100 can include repeating any or all of the processes; any or all of the processes as described in any or all of U.S. application Ser. No. 16/514, 624, filed 17 Jul. 2019; U.S. application Ser. No. 16/505, 372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/073,209, filed 1 Dec. 2022; and U.S. application Ser. No. 18/072,939, filed 1 Dec. 2022; each of which is incorporated in its entirety by this reference, or any other suitable processes performed in any suitable order. The method 100 can be performed with a system 200 as described below and/or any other suitable system.

Figure 7:
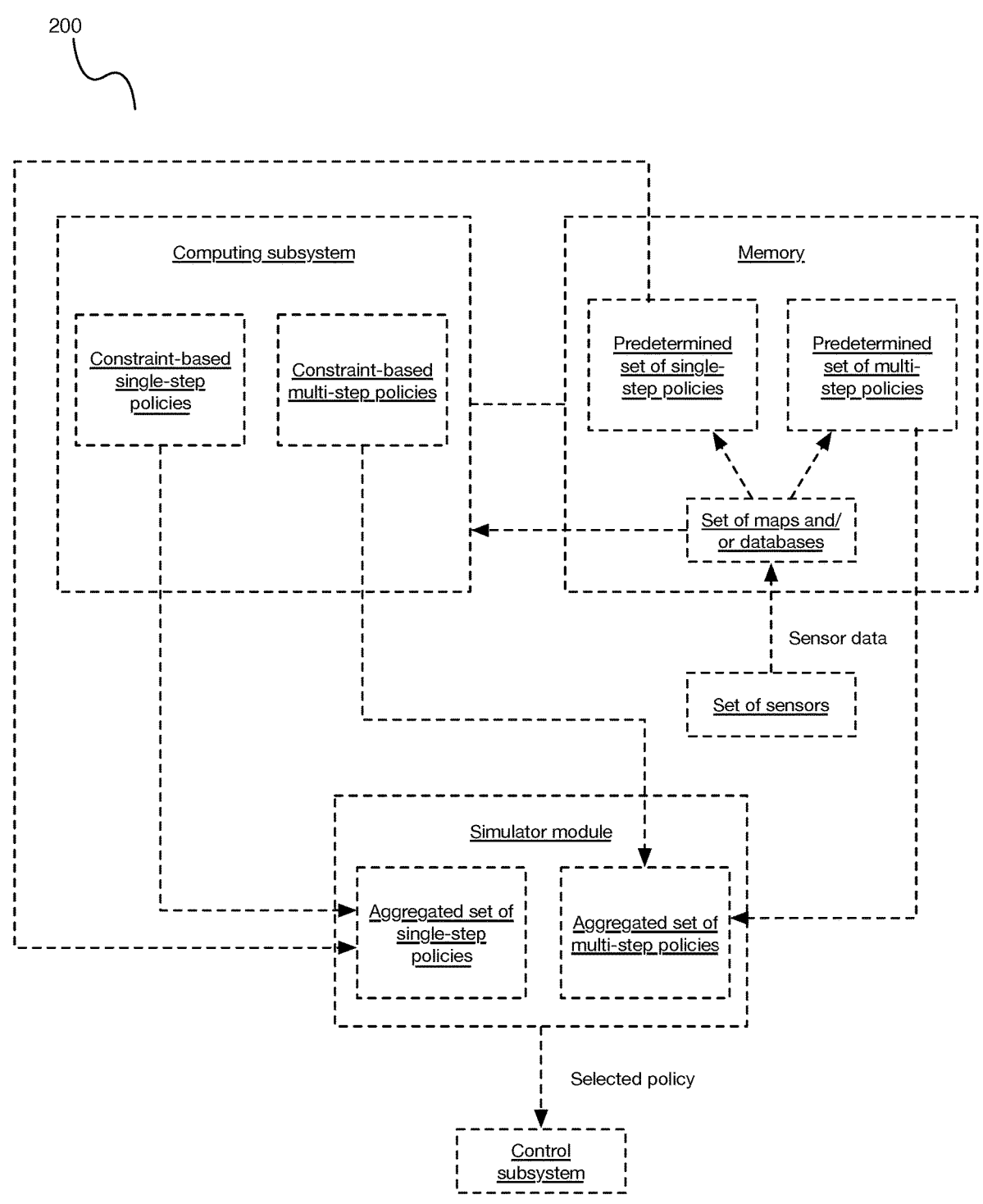
FIG. 7 depicts a variant of a system and exchange of information within the system for conditional operation of an autonomous agent.

As shown in FIG. 2, a system 200 for conditional operation of an autonomous agent (equivalently referred to herein as an ego agent and autonomous vehicle) includes a set of computing subsystems (equivalently referred to herein as a set of computers) and/or processing subsystems (equivalently referred to herein as a set of processors), which function to implement any or all of the processes of the method 100. Additionally or alternatively, the system 200 can include and/or interface with any or all of: the autonomous agent, one or more sets of sensors (e.g., onboard the ego agent, onboard a set of infrastructure devices, etc.), memory associated with the computing subsystem (e.g., storing a set of maps and/or databases as shown in FIG. 7), a simulator module, a control subsystem, a set of infrastructure devices, a teleoperator platform, a tracker, a positioning system, a guidance system, a communication interface, and/or any other components. Further additionally or alternatively, the system can include any or all of the components as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No. 17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/073,209, filed 1 Dec. 2022; and U.S. application Ser. No. 18/072,939, filed 1 Dec. 2022; each of which is incorporated in its entirety by this reference.

Additionally or alternatively, the method 100 can be performed by and/or implemented at any other suitable system(s).

2. Benefits

The system and method for conditional operation of an autonomous agent can confer several benefits over current systems and methods.

In a first variation, the technology confers the benefit of optimizing the operation of an autonomous vehicle for its current environment (e.g., scene, scenario, context, etc.) through the use of multi-step conditional policies (equivalently referred to herein as behaviors), which implement conditional logic (e.g., trigger condition) relevant to and optimized for navigating the vehicle's current particular environment. This further preferably confers the benefit of enabling forward simulations—which can be used in selecting the action(s) for the vehicle to implement—to represent what the vehicle will actually do over the length of time represented in the forward simulation, thereby enabling the most optimal policies to be selected. In examples, for instance, if the simulations are limited to simulating single actions over a relatively long simulation time scale, the results may not properly reflect what the vehicle would actually do, leading to the selection of non-optimal actions for the vehicle to implement (e.g., which can cause the vehicle to get stuck at a certain location). By having multi-step policies with trigger conditions able to be simulated—even if all the actions of the multi-step policy are not implemented in totality—more naturalistic behaviors can be implemented at the ego vehicle.

In a set of examples, the use of multi-step conditional policies prevents the need to have different types of the same policy for different types of situations, where different logic is hardcoded into these individual policies and/or the metrics (e.g., reward functions, risk metrics, cost functions, loss functions, etc.) used to evaluate the policies. Rather, single-step policies can be combined in a modular fashion and implemented with trigger conditions that initiate transitions between them within the simulation, and optionally in real-life operation of the vehicle.

In another set of examples, additional or alternative to those described above, the use of multi-step conditional policies enables the simulated behavior of the vehicle to match what actually happens during operation of the vehicle, even if the simulated multi-step policy does not actually get executed as simulated. This can enable the simulations to be highly predictive and accurate to the vehicle's actual behavior, which can in turn increase the predictive accuracy of the simulations, prevent unforeseen and/or unexpected behaviors to be executed by the vehicle, and/or otherwise confer benefits to the operation of the vehicle. In particular examples, for instance, many single-step policies would not be relevant to an entire planning horizon of the simulation (e.g., 5-10 seconds ahead into the future), which can cause the simulated vehicle to behave in ways that do not match what the vehicle actually does in its real environment. Additionally or alternatively, this can result in the vehicle electing policies that have adverse outcomes in real life (e.g., causing the vehicle to stop and not progress toward a goal/destination).

In a second variation, additional or alternative to the first, the technology confers the benefit of reducing a computational load and/or computational time required to evaluate and elect a policy for the autonomous vehicle to implement in one or more election cycles of the vehicle. In specific examples, for instance, implementing a multi-step conditional policy can be associated with a lower computational load and/or lower computational time in comparison to determining each of the steps individually (e.g., through considering all possible policies equally at each election cycle).

Implementing multi-step conditional policies can optionally additionally confer the benefit of reducing the occurrence of the ego agent sitting idle, coming to a full stop, and/or otherwise not progressing toward a goal (e.g., reaching a destination). In specific examples, for instance, the prescription of multiple steps based on defined trigger conditions can prevent the need for the vehicle to wait for a next election cycle (and/or the processing of multiple policies in an election cycle) to determine and implement a next action.

In a third variation, additional or alternative to those described above, the technology confers the benefit of improving an ability to accurately predict the actions that the vehicle will take. In specific examples, for instance, a transition between steps of a conditional policy can be triggered within an election cycle, as opposed to implementing a policy only at the beginning of an election cycle, where the policy will be completed before the election cycle ends. In these latter cases, where the vehicle would finish executing a policy before the election cycle ends, the vehicle could perform an unexpected and/or inconvenient and/or risky action with the remaining time, such as coming to a stop. Instead, the system and/or method can confer the benefit of performing more predictable and acceptable actions throughout its operation.

In a fourth variation, additional or alternative to those described above, the technology confers the benefit of reliably handling complex maneuvers, such as those involving right-of-way conventions relative to other vehicles on the road. In specific examples, for instance, the trigger conditions associated with multi-step conditional policies are determined—when relevant—in accordance with the state of other vehicles on the road and in which order the right-of-way convention should be handled among them. Reliably handling complex maneuvers can, in turn, function to enable the vehicle to operate without a safety operator onboard (and/or a teleoperator arranged remote from the vehicle) and/or with a minimized occurrence of interventions while the vehicle is operating. In specific examples, for instance, for instances in which the vehicle is approaching and/or at an intersection with other vehicles, the system and/or method can prevent cases of stop-and-go behavior by the vehicle where the vehicle attempts to move forward without having right-of-way, causing a safety stop by an operator (or any other stop, such as an emergency stop by the vehicle).

Additionally or alternatively, the method and system can confer any other benefit(s).

3. System

A shown in FIG. 2, a system 200 for conditional operation of an autonomous agent (equivalently referred to herein as an autonomous vehicle, ego vehicle, and/or ego agent) includes and/or interfaces with a computing subsystem (equivalently referred to herein as a computer), wherein the computing subsystem includes and/or interfaces with (e.g., communications with, implements, runs, etc.) a simulator subsystem (e.g., simulator module, simulation program, simulator, etc.) and/or is otherwise configured to perform and/or trigger the performance of a set of simulations (e.g., as described below). The system 200 further preferably includes and/or interfaces with the autonomous agent (equivalently referred to herein as an ego agent and/or autonomous vehicle and/or ego vehicle), one or more sets of sensors (e.g., onboard the ego agent, onboard a set of infrastructure devices, etc.), and/or any other components. Additionally or alternatively, the system can include or all of the components as described in any or all of: U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No.

17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/073,209, filed 1 Dec. 2022; and U.S. application Ser. No. 18/072,939, filed 1 Dec. 2022; each of which is incorporated in its entirety by this reference.

The system 200 preferably includes and/or interfaces with (e.g., is integrated within) an autonomous vehicle (equivalently referred to herein as an autonomous agent, agent, and/or ego agent). The autonomous agent is preferably an autonomous vehicle, further preferably a fully autonomous vehicle and/or a vehicle able to be operated as a fully autonomous vehicle, but can additionally or alternatively be a semi-autonomous vehicle and/or any other vehicle.

In preferred variations, the autonomous vehicle is an automobile (e.g., car, driverless car, bus, shuttle, taxi, rideshare vehicle, truck, semi-truck, etc.). Additionally or alternatively, the autonomous vehicle can include any or all of: a watercraft (e.g., boat, water taxi, etc.), aerial vehicle (e.g., plane, helicopter, drone, etc.), terrestrial vehicle (e.g., 2-wheeled vehicle, bike, motorcycle, scooter, etc.), and/or any other suitable vehicle and/or transportation device, autonomous machine, autonomous device, autonomous robot, and/or any other suitable device.

The autonomous agent preferably includes and/or interfaces with a computing subsystem, wherein the computing subsystem functions to process information (e.g., sensor inputs) and perform the processing and decision making for operation of the ego agent. This can include, for instance, determining any or all of: a series of policies (e.g., behaviors, actions, high-level behaviors and/or plans, etc.) for the ego agent to execute, a behavior and/or action for the vehicle to execute, a trajectory for the ego agent to execute, a set of control commands for the vehicle (e.g., actuation subsystem, steering subsystem, braking subsystem, acceleration subsystem, etc.) to execute, and/or any other information. Additionally or alternatively, the computing subsystem can function to perform any or all of the processes involved in any or all of: perception, prediction, localization, planning, and/or any other processes involved in operation of the autonomous agent.

The computing system preferably includes an onboard computing subsystem arranged onboard (e.g., integrated within) the ego agent. Additionally or alternatively, the computing system can include any or all of: a remote computing subsystem (e.g., cloud computing system, remote computing in communication with an onboard computing system, in place of an onboard computing system, etc.), a computing subsystem integrated in a supplementary device (e.g., mobile device, user device, etc.), an edge device including mobile computing devices, and/or any other suitable computing subsystems and devices. In some variations, for instance, the ego agent is operable in communication with a remote or disparate computing system that may include a user device (e.g., a mobile phone, a laptop, etc.), a remote server, a cloud server, or any other suitable local and/or distributed computing system remote from the vehicle. The remote computing subsystem can be connected to one or more systems of the autonomous agent through one or more data connections (e.g., channels), but can alternatively communicate with the vehicle system in any suitable manner.

The computing subsystem can include and/or interface with a processing subsystem (e.g., processor or set of processors, graphical processing unit or GPU, central processing unit or CPU, or any suitable processing circuitry)

and memory, but can additionally or alternatively include any other suitable components. The memory can be short term (e.g., volatile, non-volatile, random access memory or RAM, etc.) and/or long term (e.g., flash memory, hard disk, etc.) memory. The memory preferably functions to store a set of databases (e.g., lookup tables) and/or maps, which can be used in selecting any or all of the policies for consideration by the ego agent (e.g., as described below), and optionally any or all of those simulated for objects in the ego vehicle's environment (e.g., during an intent estimation process). In a preferred set of variations, for instance, one or more maps can be referenced and used to check for and determine location-associated policies for consideration by the ego vehicle (e.g., to be simulated in the simulation subsystem). These location-associated policies can include multi-step policies (e.g., including at least two actions for the vehicle and a set of trigger conditions that initiate transitions between them), single-step policies (e.g., single actions, policies absent of trigger conditions, etc.), or any combination of multi-step and single-step policies. The location-associated policies are preferably added to a base set (e.g., predetermined set, location-agnostic policies, etc.) of policies for consideration by the ego vehicle, but can additionally or alternatively be the only policies considered by the ego vehicle, supplement other dynamically determined policies, supplement predetermined and dynamic policies for consideration, and/or be otherwise considered with any other policies by the ego vehicle. Additionally or alternatively, any or all of the components and/or processes as described in U.S. application Ser. No. 17/365,538, filed 1 Jul. 2021, can be used in determining policies for consideration by the ego vehicle.

In some variations, for instance, the onboard computing subsystem functions to interact with and/or operably control any one or more of the identified components or modules described herein. In preferred variations, for instance, the onboard computing subsystem executes computer instructions for implementing a multi-policy decisioning module. In specific examples, the processing system and memory collectively function to dynamically manage the set of policies available to the autonomous agent in the framework of a multi-policy decision making framework, such as that described in any or all of: U.S. application Ser. No. 16/514, 624, filed 17 Jul. 2019, and U.S. application Ser. No. 17/365,538, filed 1 Jul. 2021, each of which is incorporated herein in its entirety by this reference. Additionally or alternatively, the processing system and memory, and/or any other suitable components, can be used for any other suitable functions.

The computing subsystem preferably includes interfaces with, and/or is configured to perform processes in conjunction with a simulator subsystem (equivalently referred to herein as a simulation subsystem) of the system, wherein the simulator subsystem functions to perform a set of simulations (e.g., as described below), wherein the set of simulations function to predict future scenarios associated with the ego agent and environmental agents (e.g., other vehicles, pedestrians, dynamic and/or static objects, etc.) in its environment (e.g., in the ego agent's surroundings, within a field of view of the ego agent's sensors, within a predetermined radius relative to the ego agent, etc.). Additionally or alternatively, the simulator subsystem can perform any other functions.

The simulator subsystem preferably includes a simulation program (e.g., simulation module, simulation software, programmed language, software script and/or programmed commands, etc.) executable by the computing subsystem, but can additionally or alternatively include any other components and/or be executable by any other components.

The simulator subsystem is preferably configured to perform forward simulations, which function to predict and analyze how the ego agent and its environment will evolve in the future (e.g., to a predetermined time within the future) based on the ego agent's current and/or historical understanding of its environment (e.g., current positions of the ego agent and environmental agents, historical positions of the ego agent and the environmental agents, current and/or historical information motion information associated with the ego agent and/or environmental agents). In a preferred set of variations, for instance, throughout operation of the autonomous vehicle—such as, but not limited to, continuously, at a predetermined frequency (equivalently referred to herein as an election cycle) (e.g., between every tenth of a second and every second, at least every second, at least every 5 seconds, between every millisecond and every second, between 5-15 times per second, 10 times per second, between 1-100 times per second, between 1-20 times per second, between 1-50 times per second, etc.), at a predetermined set of intervals, upon the collection of new sensor information, etc.—a set of simulations is performed, which forward simulate the vehicle's environment into the future for the duration of a planning horizon associated with the simulation (e.g., to a predetermined time into the future, at each of a set of predetermined time intervals for a predetermined time into the future, for between the next 1-10 seconds into the future, for less than 1 second into the future, for greater than 10 seconds into the future, for between the next 0.1-30 seconds into the future, for between the next 2-8 seconds into the future, for the next 5-10 seconds into the future, for the next 8 seconds into the future, etc.).

In preferred variations, for instance, the duration of time into the future that is simulated—referred to herein as the planning horizon—is greater than the duration of time between consecutive simulation sets for policy selection (as specified by an election cycle). In examples, the planning horizon is at least an order of magnitude greater than the time between consecutive simulations. In particular examples, simulations are performed multiple times per second (e.g., between 1-50 times per second, between 1-40 times per second, between 1-30 times per second, between 1-20 times per second, between 1-10 times per second, between 5-10 times per second, etc.), where each simulation looks forward in time multiple seconds (e.g., between 1-10 seconds, between 5-10 seconds, between 1-20 seconds, between 1-30 seconds, etc.). Additionally or alternatively, the planning horizon can be equal to the duration of time between consecutive simulation sets for policy selection, the planning horizon can be shorter than the duration of time between consecutive simulation sets for policy selection, the planning horizon duration and/or duration of time between consecutive simulation sets for policy selection can be variable (e.g., dynamically determined), and/or can be otherwise suitably determined.

Additionally or alternatively, the simulator subsystem can perform any other simulations and/or types of simulations.

In specific examples, the multi-policy decision-making module includes and/or implements a simulator module or similar machine or system that functions to estimate future (e.g., steps forward in time) behavioral policies (operations or actions or behaviors) for each of the environmental agents (e.g., other vehicles in an environment of the ego agent) and/or objects (e.g., pedestrians) identified in an operating environment of the autonomous agent (real or virtual) including potential behavioral policies that may be executed by the ego agent. The simulations may be based on a current state of each agent (e.g., the current hypotheses) and/or historical actions or historical behaviors of each of the agents derived from the historical data buffer (preferably including data up to a present moment). The simulations may provide data relating to interactions (e.g., relative positions, relative velocities, relative accelerations, etc.) between projected behavioral policies of each agent and the one or more potential behavioral policies that may be executed by the autonomous agent.

Additionally or alternatively, the simulation subsystem can be operated independently of and/or outside of a multi-policy decision-making module.

The system 100 can optionally include a communication interface in communication with the computing system, which functions to enable information to be received at (e.g., from infrastructure devices, from a remote computing system and/or remote server, from a teleoperator platform, from another autonomous agent or other vehicle, etc.) and transmitted from the computing system (e.g., to a remote computing system and/or remote server, to a teleoperator platform, to an infrastructure device, to another autonomous agent or other vehicle, etc.). The communication interface preferably includes a wireless communication system (e.g., Wi-Fi, Bluetooth, cellular 3G, cellular 4G, cellular 5G, multiple-input multiple-output or MIMO, one or more radios, or any other suitable wireless communication system or protocol), but can additionally or alternatively include any or all of: a wired communication system (e.g., modulated powerline data transfer, Ethernet, or any other suitable wired data communication system or protocol), a data transfer bus (e.g., CAN, FlexRay), and/or any other suitable components.

The system 100 can optionally include and/or interface with (e.g., receive information from) a set of infrastructure devices (e.g., as shown in FIG. 2), equivalently referred to herein as roadside units, which individually and/or collectively function to observe one or more aspects and/or features of an environment and collect observation data relating to the one or more aspects and/or features of the environment. The set of infrastructure devices are preferably in communication with an onboard computing system of the autonomous agent, but can additionally or alternatively be in communication with the tele-assist platform, any other components, and/or any combination.

The infrastructure devices preferably include devices in an immediate and/or close proximity or within short-range communication proximity to an operating position of an autonomous agent and can function to collect data regarding circumstances surrounding the autonomous agent and in areas proximate to a zone of operation of the autonomous agent. In some embodiments, the roadside units include one or more of offboard sensing devices including flash LIDAR, thermal imaging devices (thermal cameras), still or video capturing devices (e.g., image cameras and/or video cameras, etc.), global positioning systems, radar systems, microwave systems, inertial measuring units (IMUs), and/or any other suitable sensing devices or combination of sensing devices.

The system preferably includes and/or interfaces with a sensor suite (e.g., computer vision system, LIDAR, RADAR, wheel speed sensors, GPS, cameras, etc.), wherein the sensor suite (equivalently referred to herein as a sensor system) is in communication with the onboard computing system and functions to collect information with which to determine one or more trajectories for the autonomous agent. Additionally or alternatively, the sensor suite can function to enable the autonomous agent operations (such as autonomous driving), data capture regarding the circumstances surrounding the autonomous agent, data capture relating to operations of the autonomous agent, detecting maintenance needs (e.g., through engine diagnostic sensors, exterior pressure sensor strips, sensor health sensors, etc.) of the autonomous agent, detecting cleanliness standards of autonomous agent interiors (e.g., internal cameras, ammonia sensors, methane sensors, alcohol vapor sensors), and/or perform any other suitable functions.

The sensor suite preferably includes sensors onboard the autonomous vehicle (e.g., RADAR sensors and/or LIDAR sensors and/or cameras coupled to an exterior surface of the agent, IMUs and/or encoders coupled to and/or arranged within the agent, audio sensors, proximity sensors, temperature sensors, etc.), but can additionally or alternatively include sensors remote from the agent (e.g., as part of one or more infrastructure devices, sensors in communication with the agent, etc.), and/or any suitable sensors at any suitable locations.

The sensors can include any or all of: cameras (e.g., visual range, multispectral, hyperspectral, IR, stereoscopic, etc.), LiDAR sensors, RADAR sensors, orientation sensors (e.g., accelerometers, gyroscopes, altimeters), acoustic sensors (e.g., microphones), other optical sensors (e.g., photodiodes, etc.), temperature sensors, pressure sensors, flow sensors, vibration sensors, proximity sensors, chemical sensors, electromagnetic sensors, force sensors, or any other suitable type of sensor.

In a preferred set of variations, the sensors include at least a set of optical sensors (e.g., cameras, LiDAR, etc.), and optionally any or all of: RADAR sensors, vehicle sensors (e.g., speedometers, orientation sensors, accelerometers, etc.), and/or any other sensors.

The system can optionally include and/or interface with a vehicle control subsystem including one or more controllers and/or control systems, which include any suitable software and/or hardware components (e.g., processor and computer-readable storage device) utilized for generating control signals for controlling the autonomous agent according to a routing goal of the autonomous agent and selected behavioral policies and/or a selected trajectory of the autonomous agent.

In preferred variations, the vehicle control system includes, interfaces with, and/or implements a drive-by-wire system of the vehicle. Additionally or alternatively, the vehicle can be operated in accordance with the actuation of one or more mechanical components, and/or be otherwise implemented.

Additionally or alternatively, the system 100 can include and/or interface with any other suitable components.

4. Method

As shown in FIG. 1, a method 100 for conditional operation of an autonomous agent can include any or all of: collecting a set of inputs Silo; processing the set of inputs S120; determining a set of policies for the agent S130; evaluating the set of policies S140; and operating the ego agent S150. Additionally or alternatively, the method 100 can include repeating any or all of the processes; any or all of the processes as described in U.S. application Ser. No. 16/514,624, filed 17 Jul. 2019; U.S. application Ser. No. 16/505,372, filed 8 Jul. 2019; U.S. application Ser. No. 16/540,836, filed 14 Aug. 2019; U.S. application Ser. No. 16/792,780, filed 17 Feb. 2020; U.S. application Ser. No. 17/365,538, filed 1 Jul. 2021; U.S. application Ser. No.

17/550,461, filed 14 Dec. 2021; U.S. application Ser. No. 17/554,619, filed 17 Dec. 2021; U.S. application Ser. No. 17/712,757, filed 4 Apr. 2022; U.S. application Ser. No. 17/826,655, filed 27 May 2022; U.S. application Ser. No. 18/073,209, filed 1 Dec. 2022; and U.S. application Ser. No. 18/072,939, filed 1 Dec. 2022; each of which is incorporated in its entirety by this reference, or any other suitable processes performed in any suitable order. The method 100 can be performed with a system 200 as described above and/or any other suitable system(s).

The method 100 is preferably configured to interface with a multi-policy decision-making process (e.g., multi-policy decision-making task block of a computer-readable medium) of the ego agent and any associated components (e.g., computers, processors, software modules, etc.), but can additionally or alternatively interface with any other decision-making processes. In a preferred set of variations, for instance, a multi-policy decision-making module of a computing system (e.g., onboard computing system) includes a simulator module (or similar machine or system) (e.g., simulator task block of a computer-readable medium) that functions to predict (e.g., estimate) the effects of future (i.e., steps forward in time) behavioral policies (operations or actions) implemented at the ego agent and optionally those at each of the set environmental agents (e.g., other vehicles in an environment of the ego agent) and/or objects (e.g., pedestrians) identified in an operating environment of the ego agent. The simulations can be based on a current state of each agent (e.g., the current hypotheses) and/or historical actions or historical behaviors of each of the agents derived from the historical data buffer (preferably including data up to a present moment). The simulations can provide data relating to interactions (e.g., relative positions, relative velocities, relative accelerations, etc.) between projected behavioral policies of each environmental agent and the one or more potential behavioral policies that may be executed by the autonomous agent.

The resulting data from the simulations can be used to determine (e.g., calculate) any number of metrics, which can individually and/or collectively function to assess any or all of: the potential impact of the ego agent on any or all of the environmental agents when executing a certain policy, the risk of executing a certain policy (e.g., collision risk), the extent to which executing a certain policy progresses the ego agent toward a certain goal, and/or determining any other metrics involved in evaluating, comparing, and/or ultimately selecting a policy for the ego agent to implement in real life operation.

The set of metrics can optionally include and/or collectively determine (e.g., through aggregating any or all of the set of metrics described below) a cost function (and/or loss function) associated with each proposed ego agent policy based on the set of simulation(s) performed for that proposed policy. Additionally or alternatively, the set of metrics described below can be individually determined and/or analyzed, other metrics can be determined, the metrics can be aggregated in other suitable ways, and/or the metrics can be otherwise configured. With these metrics (e.g., scores) and/or functions, a best policy from the set of policies can be selected, such as by comparing the metrics and/or functions among the different proposed policies and selecting a policy based on the comparison (e.g., policy with highest metric value, policy with lowest metric value, policy that has a lowest cost/loss function, policy that optimizes [e.g., maximizes, minimizes, etc.] an objective function, policy that has a highest reward function as normalized by risk, etc.).

The multi-policy decision-making process can additionally or alternatively include and/or interface with any other processes, such as, but not limited to, any or all of the processes described in: U.S. application Ser. No. 16/514,624, filed 17 Jul. 2019; and U.S. application Ser. No. 17/365,538, filed 1 Jul. 2021; each of which is incorporated in its entirety by this reference, or any other suitable processes performed in any suitable order.

Additionally or alternatively, the method 100 can include and/or interface with any other decision-making processes. 4.1 Method—Collecting a Set of Inputs Silo The method 100 can include collecting a set of inputs Silo, which functions to receive information with which to perform and/or initiate any or all of the remaining processes of the method 100. In preferred variations, for instance, Silo can function to receive information with which to perform any or all of: checking for and/or characterizing a scene associated with the ego agent (e.g., in S120); selecting a set of policies for consideration by the ego agent (e.g., in S130); performing a set of forward simulations and/or otherwise evaluating the policies for consideration (e.g., in S140); operating the ego agent (e.g., in S150); triggering a transition in actions within a multi-step policy (e.g., in S150); and/or can function to perform any other purposes.

Silo is preferably performed continuously (e.g., at a predetermined frequency, at irregular intervals, etc.) throughout operation of the ego agent, but can additionally or alternatively be performed: according to (e.g., at each initiation of, during each of, etc.) a cycle associated with the ego agent, such as any or all of: an election cycle (e.g., 10 Hz cycle, between 5-20 Hz cycle, etc.) associated with the ego agent (e.g., in which the ego agent selects a policy to implement, in which the ego agent selects a new policy, etc.), a perception cycle associated with the ego agent, a planning cycle (e.g., 30 Hz, between 20-40 Hz, occurring more frequently than the election cycle, etc.) associated with the ego agent; in response to a trigger (e.g., a request, an initiation of a new cycle, etc.); and/or at any other times during the method 100.

The inputs preferably include sensor inputs received from a sensor suite (e.g., cameras, Lidars, Radars, motion sensors [e.g., accelerometers, gyroscopes, etc.], outputs of an OBD-port, etc.], location sensors [e.g., GPS sensor], etc.) onboard the ego agent, but can additionally or alternatively include historical information associated with the ego agent (e.g., historical state estimates of the ego agent) and/or environmental agents (e.g., historical state estimates for the environmental agents), sensor inputs from sensor systems off-board the ego agent (e.g., onboard other ego agents or environmental agents, onboard a set of infrastructure devices and/or roadside units, etc.), information and/or any other inputs.

The inputs preferably include information associated with the ego agent, which herein refers to the vehicle being operated during the method 100. This can include information which characterizes the location of the ego agent (e.g., relative to the world, relative to one or more maps, relative to other objects, etc.), motion (e.g., speed, acceleration, etc.) of the ego agent, orientation of the ego agent (e.g., heading angle), a performance and/or health of the ego agent and any of its subsystems (e.g., health of sensors, health of computing system, etc.), and/or any other information.

The inputs further preferably include and/or can be used to determine (e.g., with pre-processing, processing, etc.) information associated with (e.g., characterizing) the environment of the ego agent, which can include: other objects (e.g., vehicles, pedestrians, stationary objects, etc.) proximal to the ego agent (e.g., within field-of-view of its sensors, within a predetermined distance, etc.); the potential presence of objects in the ego agent's environment that are not directly detected (e.g., due to obstructions in the ego agent's environment that might conceal the presence of such objects); environmental features of the ego agent's surroundings (e.g., to be referenced in a map, to locate the ego agent, etc.); and/or any other information. In some variations, for instance, the set of inputs includes information (e.g., from sensors onboard the ego agent, from sensors in an environment of the ego agent, from sensors onboard the objects, etc.) which characterizes any or all of: the location, type/class (e.g., vehicle vs. pedestrian, etc.), orientation (e.g., heading angle), and/or motion of environmental agents being tracked by the system 200, where environmental agents refers herein to other vehicles (e.g., manually driven vehicles, autonomously driven vehicles, semi-autonomously-driven vehicles, etc.) in an environment of the ego agent. Additionally or alternatively, the set of inputs can include information that characterizes (e.g., locates, identifies, etc.) features of the road and/or other landmarks/infrastructure (e.g., where lane lines are, where the edges of the road are, where traffic signals are and which type they are, where agents are relative to these landmarks, etc.), such that the ego agent can locate itself within its environment (e.g., in order to reference a map), and/or any other information.

S110 can optionally include pre-processing any or all of the set of inputs, which functions to prepare the set of inputs for analysis in the subsequent processes of the method 100. Pre-processing the set of inputs can optionally include calculating state estimates for the ego agent and/or the environmental agents based on the set of inputs. The state estimates preferably include at least the position and velocity associated with the agent, but can additionally or alternatively include orientation information (e.g., a heading angle), other motion/movement information such as acceleration and/or angular motion parameters (e.g., angular velocity, angular acceleration, etc.), and/or any other parameters.

Pre-processing the set of inputs can optionally additionally or alternatively include determining one or more geometric properties/features associated with the environmental agents/objects (e.g., with a computer vision module of the computing system), such as defining a 2D geometry associated with the environmental agents (e.g., 2D geometric hull, 2D profile(s), outline of agent, etc.), a 3D geometry associated with the environmental agent, and/or any other geometries. This can be used, for instance, to determine the lane or lanes (e.g., with associated probability/confidence values) that an environmental agent may be present in; the width of a lane that an object is obstructing (e.g., for electing a veering behavior as described below); the parameter values for implementation in trigger conditions associated with multi-step policies; a size of agents or objects (e.g., obstructions); and/or any other information.

Pre-processing the set of inputs can optionally additionally or alternatively include determining one or more classification labels associated with any or all of the set of environmental objects/agents, and further optionally a probability and/or confidence (as represented in a probability) associated with the classification label(s). The classification labels preferably correspond to a type of agent, such as, but not limited to: a vehicle (e.g., binary classification of a vehicle) and/or type of vehicle (e.g., sedan, truck, shuttle, bus, emergency vehicle, etc.); pedestrian; animal; inanimate object (e.g., obstacle in roadway, construction equipment, traffic cones, etc.); and/or any other types of agents. The classification labels are preferably determined, at least in part, based on the geometric properties of the agent (e.g., size, profile, 2D hull, etc.) and any or all of the state estimates (e.g., velocity, position, etc.), but can additionally or alternatively be otherwise determined.

Additionally or alternatively, Sino can include any other processes.

4.2 Method—Processing the Set of Inputs S120

The method 100 can include processing the set of inputs S120, which can function to detect and/or characterize a scenario (equivalently referred to herein as a scene) and/or context associated with the agent, where the scenario and/or context can be used in subsequent processes of the method to determine a set of optimal policies for consideration by the ego agent. Additionally or alternatively, S120 can function to enable performance of any other processes of the method 100, reference a map and/or set of databases based on the set of inputs to inform the set of policies to be considered by the ego vehicle, and/or can perform any other functions.

S120 is preferably performed in response to Sino, but can additionally or alternatively be performed in response to any other processes of the method 100, continuously (e.g., at a predetermined frequency, according to a planner cycle frequency, etc.), in response to a trigger, and/or at any other times. Additionally or alternatively, the method 100 can be performed in absence of S120, and/or the method can be otherwise suitably performed.

S120 is preferably performed at a computing system (e.g., onboard computing system) of the ego agent, such as at/with a planner of the ego agent. Additionally or alternatively, S120 can be performed at/with a perception module (e.g., perception processor, perception computing subsystem) of the ego agent, a prediction module of the ego agent, and/or with any other components.

S120 can optionally include characterizing the environmental surroundings (e.g., current environmental surroundings, anticipated and/or upcoming environmental surroundings, etc.) of the ego vehicle, as represented as a scenario (and/or context(s) as described below), wherein the scenario and/or context(s) are preferably determined based on processing perception information (e.g., sensor data) to determine geometrical features associated with the ego agent's environment. Optionally, determining the scenario (and/or context(s)) can include comparing any or all of these geometrical features with a map (e.g., custom map that reflects local, static objects) and/or set of databases, which can function to identify a scenario (and/or context) based on locating the ego agent (e.g., based on detected features/geometries in the ego agent's field of view) within the one or more maps and/or identifying geometrical features within a database. Additionally or alternatively, a scenario and/or context can be characterized based on dynamic features (e.g., the presence of pedestrians, the presence of pedestrians within a crosswalk, the presence of a dynamic obstacle in a heading direction of the ego vehicle, etc.) detected and/or determined by the ego vehicle (e.g., based on sensor data, based on processing of sensor data, etc.), a combination of static and dynamic features, and/or any other information.

Figure 4:
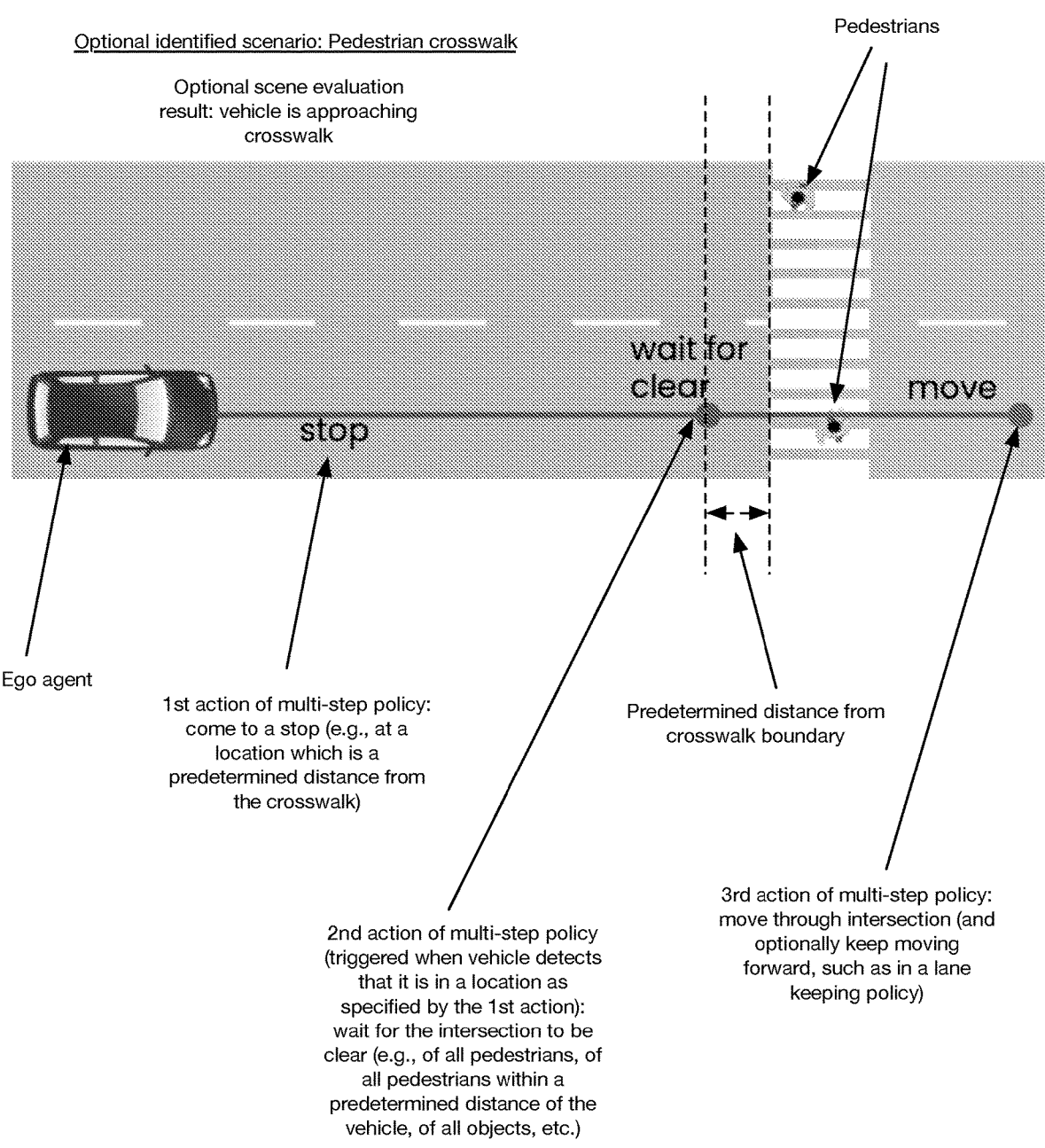
FIG. 4 depicts a first example of the method for conditional operation of an autonomous agent.
Figure 5:
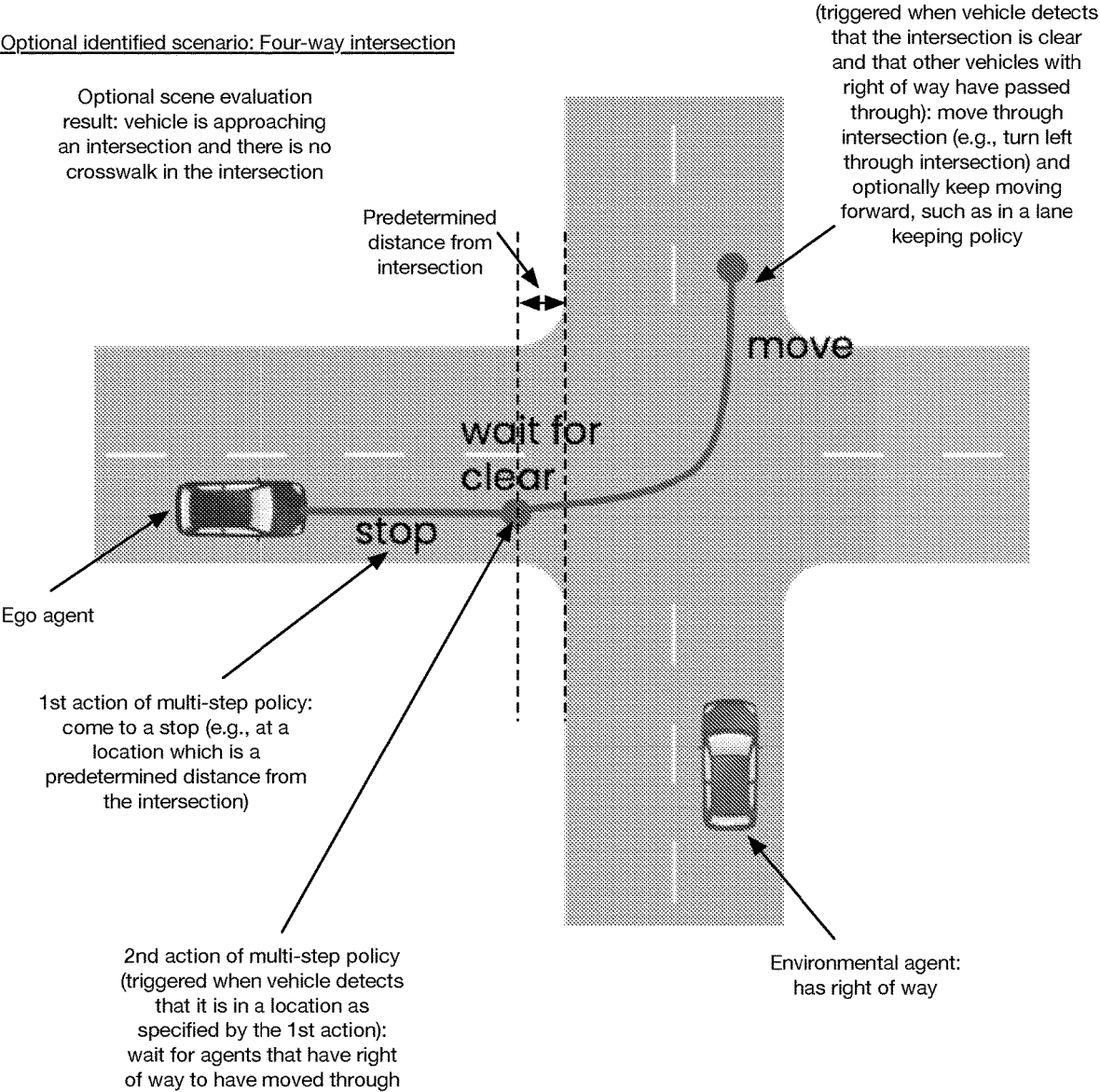
FIG. 5 depicts a second example of the method for conditional operation of an autonomous agent.

Characterizing environmental surroundings of the ego vehicle can include determining (e.g., detecting, characterizing, identifying, etc.) a scenario (equivalently referred to herein as a scene) associated with the ego agent and its location. A scenario preferably describes a driving situation and/or road feature which the ego agent is at and/or approaching, and can optionally include scenarios which are typically or can be complex for the vehicle to navigate (e.g., involve pedestrians, involve right of way conventions, involve the vehicle having to violate typical road conventions, pose the risk of the vehicle being stopped for a long period 0 the time, pose the risk of causing confusion to other drivers, etc.). Examples of scenarios include, but are not limited to: a pedestrian crosswalk (e.g., as shown in FIG. 4); a four-way intersection (e.g., as shown in FIG. 5); another intersection (e.g., three-way intersection); an obstruction in the road (e.g., as shown in FIG. 6); a transition to a one-way road; a construction zone; a merge zone and/or lane end; parking lot; and/or any other scenarios.

S120 can optionally further include determining a set of contexts associated with the scenario, where the context further characterizes the scenario. The context can optionally include and/or describe one or more features (e.g., geometrical features, parameters, etc.) associated with the scenario, such as the size and/or type of an obstruction that is ahead; a type of intersection (e.g., four-way intersection, three-way intersection, whether or not the intersection includes a crosswalk, etc.); and/or any other information. A scenario can be associated with a single context, multiple contexts, no contexts, and/or any other information. Alternatively, the scene and the context can be the same, only a scene is determined, only a set of one or more contexts is determined, and/or S120 can be otherwise suitably performed.

At any iteration of S120, the ego agent can be associated with any or all of: a single scenario, multiple scenarios, no scenario, additional features, and/or any other information. Alternatively, the ego agent can always be associated with one or more scenarios. Additionally or alternatively, at any iteration of S210, the ego agent can be associated with one or more contexts (e.g., as described below). Further additionally or alternatively, the method can be performed in absence of characterizing a scenario and/or set of contexts.

S120 can additionally or alternatively include referencing a set of maps and/or databases based on sensor data (e.g., raw sensor data, processed sensor data, aggregated sensor data, etc.), which can function to check for and/or retrieve policies to be considered in S130. In a set of variations, for instance, sensor data representing a location of the vehicle (e.g., as determined with a location sensor such as a GPS sensor) can be compared with a map and/or database in order to retrieve a set of policies (e.g., multi-step policy, single-step policy, etc.) to be considered by the ego vehicle based on that location. Additionally or alternatively, any other sensor data can be used. For instance, a determination that the vehicle is located proximal to (e.g., within a predetermined distance threshold of) and/or is approaching (e.g., based on a heading angle of the vehicle, based on a heading angle and a location, etc.) a predetermined location based on referencing a map can be used to retrieve one or more policies.

In a set of examples, for instance, a custom map can be referenced which assigns a predetermined scenario and/or context to any or all of the locations on the map. In other examples, the ego agent's location (e.g., GPS coordinates) can be determined and compared with the map to determine a predetermined scenario associated with that location.

Determining the scenario and/or context can optionally additionally or alternatively be performed with one or more computer vision processes, machine learning models and/or algorithms, and/or any other tools.

In a particular example, for instance, a set of policies specific to parking lot environments (e.g., multi-step policy that involves the ego vehicle finding an available parking spot and parking in the available parking spot) can be added to a set of policies for consideration by the ego vehicle in response to determining that the ego vehicle is located within and/or approaching a parking lot, as determined by referencing a predetermined, labeled map based on the vehicle's location. Alternatively, policies specific to parking lot environments can be added for consideration based on the detection of features that correspond to parking lot environments (e.g., processing of camera data to identify a row of parking spaces). Further alternatively, policies specific to parking lot environments (and/or other scenarios) can be always considered by the ego vehicle (e.g., included in a predetermined set of policies for consideration by the ego vehicle, where outputs of the simulation (e.g., metrics) will reflect that this is not a relevant and/or optimal policy to implement if the vehicle is not in a parking lot.

In a particular example (e.g., as shown FIG. 4), for instance, a multi-step policy specific to the vehicle approaching a pedestrian crosswalk can be considered in response to any or all of: identifying crosswalk-specific features (e.g., road markings characteristic of a crosswalk, pedestrians and/or pedestrian-sized objects moving perpendicular to a direction of travel in a lane line, crosswalk sign, etc.); referencing a map based on the vehicle's location, where the map includes a predetermined crosswalk label; based on any other information; and/or based on any combination of information. Alternatively, crosswalk-specific policies (e.g., multi-step policy shown in FIG. 4) can be always considered by the ego vehicle (e.g., as part of a predetermined set of policies for consideration).

In a particular example (e.g., as shown FIG. 5), for instance, a multi-step policy specific to the vehicle approaching a 4-way intersection can be considered in response to any or all of: identifying intersection-specific features (e.g., road markings indicating lane lanes uniting in perpendicular directions, the detection of vehicles dynamically traveling in perpendicular directions of travel, etc.); referencing a map based on the vehicle's location, where the map includes a predetermined intersection label; based on any other information; and/or based on any combination of information. Alternatively, intersection-specific policies (e.g., multi-step policy shown in FIG. 5) can be always considered by the ego vehicle (e.g., as part of a predetermined set of policies for consideration).

In a particular example (e.g., as shown FIG. 6), for instance, a multi-step policy specific to the vehicle encountering an obstruction (equivalently referred to herein as an obstacle) can be considered in response to any or all of: identifying an obstruction (e.g., detecting an object overlapping with a lane of travel of the ego vehicle, etc.); referencing a map based on the vehicle's location (e.g., in cases of static, long-lasting obstacles such as construction equipment; for potholes; etc.), where the map includes a predetermined obstacle label; based on any other information; and/or based on any combination of information. Alternatively, obstacle-specific policies (e.g., multi-step policy shown in FIG. 6) can be always considered by the ego vehicle (e.g., as part of a predetermined set of policies for consideration).

In a preferred implementation of this particular example, for instance, an obstruction-specific multi-step policy is included in a predetermined set of policies for consistent consideration by the ego vehicle, since an obstruction can occur at any location.

Additionally or alternatively, S120 can include any other sub-processes, such as determining a set of features associated with environmental agents, and/or any other processes.

4.3 Method—Determining a Set of Policies for the Agent S130

The method 100 preferably includes determining (e.g., selecting, aggregating, compiling, etc.) a set of policies for the agent S130, which functions to determine the set of policies for the agent to consider implementing in subsequent processes of the method 100. Additionally or alternatively, S130 can function to identify an optimal set of policies (e.g., based on the particular environmental surroundings of the ego vehicle) for consideration by the ego vehicle, a minimal set of policies (e.g., to reduce a computational load associated with the associated simulations), a prioritized set of policies (e.g., such that the simulations are performed in an optimal order in case time runs out to select a policy), a comprehensive set of policies (e.g., all policies that could possibly be implemented at and/or applied to the ego vehicle), any other set of policies, and/or S130 can perform any other functions.

S130 is preferably performed in response to S120, but can additionally or alternatively be performed in response to any other processes of the method 100, continuously (e.g., at a predetermined frequency, according to an election cycle frequency, etc.), in response to a trigger, and/or at any other times. Additionally or alternatively, S130 can be performed in absence of S120 and/or at any other time(s).

In a preferred set of variations, for instance, S130 is performed according to an election cycle associated with the vehicle, where the election cycle prescribes a frequency with which a set of policies are determined and evaluated for the ego agent. In a set of specific examples, the election cycle is associated with a frequency between 1 and 50 Hz (e.g., 10 Hz, 20 Hz, 30 Hz, between 5-15 Hz, between 1-20 Hz, etc.), but can alternatively be associated with a frequency less than 1 Hz, greater than 50 Hz, an irregular set of intervals, and/or any other times.

The set of policies preferably includes multiple policies, such that the multiple policies are evaluated (e.g., in simulations) in S140, with a most optimal policy for the vehicle selected (e.g., according to a scoring system) and implemented at the vehicle. Alternatively, any iteration of S130 can include determining a single policy for evaluation, such as a single multi-step policy determined based on a scenario and/or context determined in S120.

The number of policies determined at each iteration of S130 can be any or all of: a predetermined (e.g., fixed, constant, etc.) number, a variable number, and/or any other number.

The set of policies can include any or all of: single-step policies, multi-step policies, a combination of single-step and multi-step policies, and/or any other policies. A step preferably refers herein to a single action (e.g., task, behavior, etc.) of the ego vehicle, but can additionally or alternatively refer to a grouping of actions, a sub-action, and/or any other behavior of the vehicle. In a preferred set of variations, for instance, each action of a multi-step policy is an action as specified by a single-step policy, along with a set of trigger conditions associated with the transition between these actions. Additionally or alternatively, any or all actions of a multi-step policy can be different from any single-step policies.

Any or all of the multi-step policies can be dynamically determined based on S120, such as based on detecting a scenario and/or context associated with the ego agent, where the detected scenario and/or context prescribes an associated multi-step policy (e.g., according to a predetermined mapping). Additionally or alternatively, a detected scenario and/or context can prescribe multiple multi-step policies for consideration in subsequent processes of the method 100, one or more single-step policies, and/or any other policies.

Additionally or alternatively, any or all of the multi-step policies can be determined by referencing a map and/or database, predetermined, and/or determined in any other ways and/or in any combination of ways.

Further additionally or alternatively, any or all of the multi-step policies can be dynamically constructed (e.g., in a modular fashion) and/or adjusted (e.g., based on completion of one or more actions of the multi-step policy) before consideration (e.g., simulation). In some variations, for instance, a multi-step policy can be constructed in response to the vehicle's environmental surroundings. This can include, for instance, aggregating portions or all of different multi-step policies (e.g., in an event that the vehicle detects an obstacle as it approaches a crosswalk), stringing together multiple single-step policies, removing actions and/or trigger conditions from a multi-step policy (e.g., upon determining that the vehicle has already performed one or more of the initial actions of the multi-step policy (e.g., as shown in the table of FIG. 8F for the multi-step policy selected at time steps $t_3$ through $t_{10}$), altering trigger conditions associated with multi-step policies, and/or otherwise constructing and/or altering multi-step policies.

Each of the multi-step policies is preferably configured to enable the ego agent to operate in a human-like fashion and/or otherwise enable the ego agent to make progress toward a goal (e.g., reaching a destination, preventing unwanted/unnecessary stops, preventing takeover from a human operator, preventing intervention from a teleoperator, etc.), which can include any or all of: reducing and/or eliminating the time that the ego agent would sit idle (e.g., despite being able to/allowed to move on account of only simulating single-step policies over long planning cycles); reducing a number of stops and/or the occurrence of pulling over to the side of the road; reducing behavior which is disruptive to other vehicles on the road; reducing behavior which is risky; reducing behavior which is overly conservative; and/or the multi-step policies can be otherwise configured.

In some variations, one or more multi-step policies are associated with a single scenario and one or more contexts. In a set of specific examples, for instance, a scenario in the form of a four-way intersection is determined, which is associated with two (or more) contexts, including that the vehicle is approaching an intersection and that there is a crosswalk in the intersection. In another set of specific examples (e.g., as shown in FIG. 5), a scenario in the form of a four-way intersection is determined, which is associated with two contexts, the two contexts including that the vehicle is approaching an intersection and that there is no crosswalk in the intersection. In variations including multiple contexts, the multi-step policy preferably prescribes actions which are aggregated (e.g., in a non-repeating fashion) from the multiple contexts. Additionally or alternatively, multi-step policies associated with each of the contexts can be independently evaluated in S140. Further additionally or alternatively, each scenario can be associated with a single context and/or the multi-step policies can be otherwise determined.

Each of the set of multi-step policies is preferably associated with (e.g., prescribes, defines, includes, etc.) a set of conditions (equivalently referred to herein as trigger conditions), wherein a condition functions to initiate a transition between steps of the multi-step policy. The set of conditions is preferably defined by and/or determined with a set of parameters, which can include any or all of: distance parameters (e.g., distance to a crosswalk, distance to an intersection, distance to a dynamic object, etc.), size parameters (e.g., size of an obstruction, width of a lane, etc.), the presence and/or proximity of objects (e.g., pedestrians), temporal parameters, motion parameters (e.g., of the ego agent, of environmental objects, velocity thresholds, acceleration thresholds, etc.), and/or any other parameters. Additionally or alternatively, any or all of the conditions can be associated with a set of driving conventions, such as right-of-way conventions among multiple vehicles (e.g., at a 4-way stop, at an intersection, etc.). Further additionally or alternatively, any or all of the conditions can be associated with any other information.

The parameters can be any or all of: predetermined, dynamically determined, and/or any combination.

Triggering a transition between steps of a multi-step policy (e.g., in simulations, in actual operation of the ego vehicle, etc.) preferably includes checking for satisfaction of the condition, which can include any or all of: comparing the parameter value(s) with one or more thresholds; comparing the parameter value(s) with a prescribed set of values (e.g., optimal values); evaluating a set of decision trees and/or algorithms; referencing a lookup table and/or database; evaluating a set of models (e.g., trained models, machine learning models, etc.); checking to see if the ego agent has right-of-way (or that any other driving/traffic/courtesy conventions have been satisfied); and/or otherwise evaluating the set of parameters.

The single-step policies are preferably predetermined, such as constant among all iterations of S130. These can include, for instance, a set of standard (e.g., common) policies which are considered at each election cycle, such as, but not limited to: coming to a stop, slowing down, speeding up, driving straight (e.g., maintaining a lane), changing lanes, merging, and/or any other policies. Alternatively, any or all of the single-step policies can be dynamically determined, such as based on any or all of: a location associated with the ego agent (e.g., in comparison with a map), any other inputs (e.g., sensor information) collected in S110, information associated with an environment (e.g., other vehicles, neighboring objects, etc.) of the ego agent, and/or any other information. Further additionally or alternatively, any or all of the single-step policies can be determined based on S120, such as based on a scenario and/or context associated with the ego agent.

In a first set of variations, the set of policies determined in S130 includes a predetermined set of single-step policies, a predetermined set of multi-step policies, and optionally one or more environment-specific multi-step policies in an event that a scenario and/or context and/or particular location for the ego vehicle is determined in S120. In specific examples, in an event that no scenario and/or context is determined in S120, the set of policies determined in S130 includes only single-step policies. In other specific examples, in an event that no scenario and/or context is determined in S120, the set of policies determined in S130 includes predetermined single-step policies and predetermined multi-step policies.

In additional or alternative variations, S120 can prescribe single-step policies, the set of policies can include predetermined multi-step policies, and/or any other policies can be determined.

S130 can optionally include leveraging policy determination from a prior iteration of S130 (e.g., prior election cycle) in determining the policies for consideration in the current iteration of S130 (e.g., current election cycle). This can include, for instance, forwarding the best policies from the last election cycle to the new/current cycle. This can additionally or alternatively include reducing the number of policies considered at current/future election cycles. If, for instance, the ego agent is still in the middle of a multi-step policy when a next election cycle occurs, the consideration of other policies can optionally be eliminated and/or minimized (e.g., only policies which could naturally occur in the particular scenario can be considered, only policies which reflect an emergency are considered together with the current multi-step policy, etc.). Alternatively, a standard set of policies can be consistently considered in each election cycle regardless of whether or not the ego agent is implementing a multi-step policy.

Additionally or alternatively, S130 can include altering the multi-step policies (e.g., as described above) to remove actions and/or trigger conditions from the multi-step policies once these actions and/or trigger conditions have already been initiated by the ego vehicle and/or are no longer relevant for implementation.

In a first set of variations of S130, determining the set of policies includes determining one or more multi-step policies in response to detecting a scenario and/or set of contexts associated with the ego agent in S120. The set of policies can optionally include one or more predetermined policies, such as a set of standard single-step policies.

In a first specific example (e.g., as shown in FIG. 4), a scenario corresponding to a pedestrian crosswalk is detected in an environment (e.g., upcoming environment) of the ego agent (e.g., based on a dynamic processing of sensor data, based on camera data, based on location data and referencing a map based on the location data, etc.), which can optionally be associated with a context of the vehicle approaching the crosswalk. In response, a multi-step policy is added to the set of policies to be evaluated for consideration (e.g., in S140), wherein the multi-step policy prescribes 3 actions. The $1^{st}$ action includes the ego agent coming to a stop, which is preferably defined based on a fixed distance parameter relative to the crosswalk (e.g., relative to a boundary of the crosswalk closest to the ego agent, relative to a broad edge of the crosswalk, etc.) such that the first action prescribes that the ego agent come to a stop at a predetermined distance relative to a boundary of the crosswalk. Alternatively, the fixed distance parameter can instead include a range of acceptable distances and/or any other parameter(s). In some examples, for instance, instead of a distance parameter, the first action can prescribe a deceleration value for the vehicle, a set of decreasing speeds for the vehicle to progress toward, and/or any other parameters. The $2^{nd}$ action includes waiting for the crosswalk to be clear. The $2^{nd}$ action is triggered in response to a trigger condition, which indicates that the $1^{st}$ action has been completed/satisfied (e.g., in the simulation, in actual operation, etc.). In this example, the trigger condition from the $1^{st}$ action to the $2^{nd}$ action preferably includes detecting that the vehicle has come to a stop (e.g., has a speed of zero), but can additionally or alternatively include detecting that the vehicle is within a predetermined distance of the crosswalk, that the vehicle has decelerated a certain amount, that the vehicle has a speed below a predetermined threshold, that the vehicle is at a predetermined location, and/or the trigger condition can be otherwise suitably defined. The $3^{rd}$ action includes moving through the crosswalk (and optionally continuing onward such as in a lane-keeping behavior), and is preferably triggered in response to detecting (e.g., in the simulation, in actual operation, etc.) that the crosswalk is clear of all pedestrians, such as through determining that there is no pedestrian within the boundaries of the crosswalk, determining that all pedestrians are within a predetermined distance from the vehicle, and/or determining any other condition. Additionally or alternatively, the trigger condition can include determining that there are no objects within the crosswalk, determining that the road ahead of the crosswalk is clear of vehicles (e.g., at least a car's distance ahead of the crosswalk) such that the vehicle will not block the crosswalk, and/or determining the satisfaction of any other conditions. This multi-step policy is preferably simulated (along with other policies for consideration by the ego vehicle), where applicable actions and trigger conditions of the multi-step policy are simulated over the duration of the planning horizon in the simulation, such that a score can be calculated for the multi-step policy and used in determining whether or not to implement the multi-step policy (e.g., an initial action of the multi-step policy, the portion of the multi-step policy that can be implemented by the ego vehicle before the next election cycle, etc.) in operation of the ego vehicle. Additionally or alternatively, any other multi-step policy (with any suitable actions and/or conditions) can be determined, and/or the set of policies for the scenario can be absent of a multi-step policy.

In a second specific example (e.g., as shown in FIG. 5), a scenario corresponding to a four-way intersection is detected in an environment of the ego agent, wherein the four-way intersection is further characterized (e.g., through a context determination) as one which does not have a crosswalk. The scene evaluation (e.g., in S120) can optionally further determine the order in which agents in the environment (e.g., waiting at and/or approaching the intersection) have right-of-way privileges (e.g., upon detecting that the four-way intersection has stop signs and/or yield signs rather than traffic lights). In response to this scenario and/or contexts, a multi-step policy is added to the set of policies to be evaluated for consideration (e.g., in S140), wherein the multi-step policy prescribes 3 actions. The $1^{st}$ action includes the ego agent coming to a stop, such as at a predetermined location relative to one or more features of the intersection (e.g., a stop sign, a lane edge for cross-flow traffic, etc.). The $2^{nd}$ action includes the ego agent waiting, which is preferably triggered in response to any or all of the following conditions: the ego agent having come to a stop, the ego agent being located at a particular location relative to the intersection, and/or any other condition(s). The $3^{rd}$ action includes the ego agent proceeding through the intersection (e.g., moving forward, turning left, turning right, etc.), which is preferably triggered in response to detecting that the intersection is clear and that all other vehicles which have right-of-way before the ego agent have passed through the intersection. This multi-step policy is preferably simulated (along with other policies for consideration by the ego vehicle), where applicable actions and trigger conditions of the multi-step policy are simulated over the duration of the planning horizon in the simulation, such that a score can be calculated for the multi-step policy and used in determining whether or not to implement the multi-step policy (e.g., an initial action of the multi-step policy, the portion of the multi-step policy that can be implemented by the ego vehicle before the next election cycle, etc.) in operation of the ego vehicle. Additionally or alternatively, any other multi-step policy (with any suitable actions and/or conditions) can be determined, and/or the set of policies for the scenario can be absent of a multi-step policy.

In a third specific example (e.g., as shown in FIG. 6), a scenario corresponding to an obstruction in the road ahead of the ego agent is detected. S120 can optionally further include detecting a type of obstruction, a size of the obstruction (e.g., length, width, amount of the lane that the object is obstructing, etc.), and/or any other features associated with the obstruction and/or the ego agent's environment. In response to this scenario and/or contexts, a multi-step policy is added to the set of policies to be evaluated for consideration (e.g., in S140), wherein the multi-step policy prescribes 2 actions. The $1^{st}$ action prescribes that the vehicle veer left (or optionally right depending on the direction of traffic and/or the location of the obstruction) according to one or more parameters associated with the obstruction (e.g., width, length, etc.) and/or the obstruction's placement relative to the road (e.g., fraction of lane that object is obstructing). Additionally or alternatively, the veer action can prescribe that the vehicle follow (e.g., center itself on) the lane boundary line and/or any other infrastructure markers. The $2^{nd}$ action prescribes that the vehicle resume normal driving within its lane (e.g., veer back to the lane centerline and drive forward), and is preferably triggered in response to a parameter associated with the obstruction, such as detecting that the vehicle has reached a location which is within a predetermined distance relative to a far edge of the obstruction (e.g., such that the vehicle has proper clearance relative to the obstruction). This multi-step policy is preferably simulated (along with other policies for consideration by the ego vehicle), where applicable actions and trigger conditions of the multi-step policy are simulated over the duration of the planning horizon in the simulation, such that a score can be calculated for the multi-step policy and used in determining whether or not to implement the multi-step policy (e.g., an initial action of the multi-step policy, the portion of the multi-step policy that can be implemented by the ego vehicle before the next election cycle, etc.) in operation of the ego vehicle. Additionally or alternatively, any other multi-step policy (with any suitable actions and/or conditions) can be determined, and/or the set of policies for the scenario can be absent of a multi-step policy.

Additionally or alternatively, S130 can include any other suitable processes.

4.4 Method—Evaluating the Set of Policies S140

The method can include evaluating the set of policies S140, which functions to select an optimal policy for the ego agent to implement.

S140 is preferably performed in response to S130, but can additionally or alternatively be performed in response to any other processes of the method 100, in response to a trigger, according to a cycle and/or frequency, and/or can be otherwise suitably performed.

In a preferred set of variations, S140 is performed in accordance with a multi-policy decision-making process (e.g., as described above), which can include simulating (e.g., forward simulating, forward simulating for 5-10 seconds ahead in time, etc.) each of the set of proposed policies, determining a score or scores for each of the set of proposed policies, comparing scores among the different policies, and selecting a policy for the ego agent to implement based on the comparison. Any or all of the scores can optionally be determined based on a detected scenario associated with the ego agent, such that policies which are more optimally configured for a particular scenario can be appropriately scored higher (and/or have a lower cost/loss function). Additionally or alternatively, any or all of the scores can be determined in absence of a detected scenario, determined based on other information (e.g., one or more contexts), and/or otherwise determined.

Additionally or alternatively, S140 can include any other processes performed in any suitable order.

4.5 Method—Operating the Ego Agent S150

Figure 3:
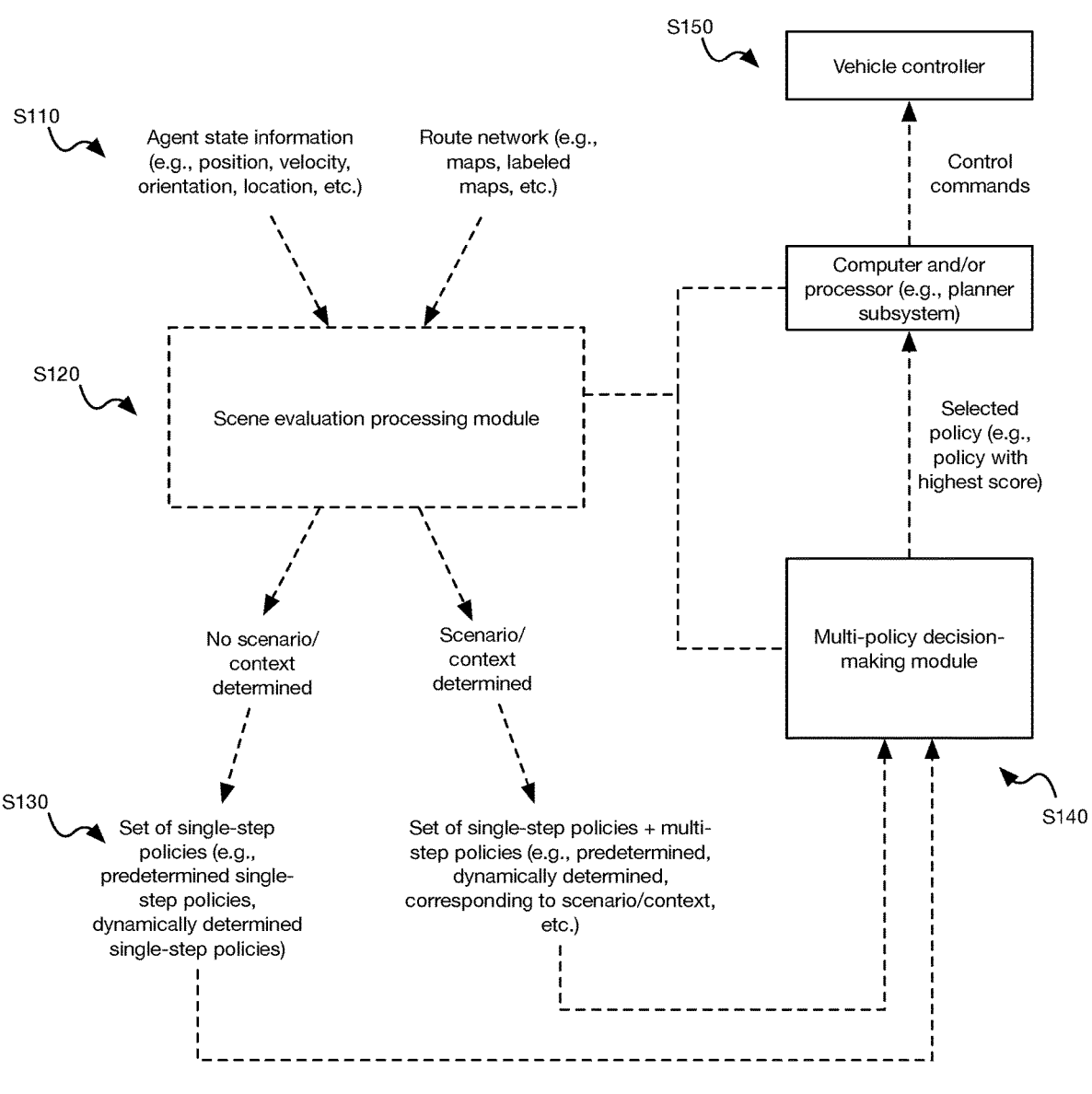
FIG. 3 depicts a schematic variation of the method for conditional operation of an autonomous agent.

The method can include operating the ego agent S150, which functions to control the ego agent (e.g., through a set of control commands as shown in FIG. 3 configured to implement the selected policy).

S150 is preferably performed with a planner and a controller of the ego agent, but can additionally or alternatively be performed with any other suitable subsystems. In a preferred set of variations, the planner is associated with a planning frequency which is higher than the election cycle frequency, but can additionally or alternatively be associated with a lower frequency and/or any other frequencies.

In cases in which the ego agent is implementing a multi-step policy, S150 preferably includes checking for satisfaction of the set of trigger conditions (e.g., with a set of computer vision processes, based on sensor data collected in S110, etc.) associated with the multi-step policy, such that a transition between steps of the multi-step policy can be appropriately triggered. Additionally or alternatively, S150 can include any other suitable processes.

In an event that a multi-step policy is selected for implementation in S140, S150 preferably includes implementing the portion of the multi-step policy that applies to the duration of that election cycle and any future election cycles in which that particular multi-step policy continues to be selected. This can mean, for instance, that only a portion of a selected multi-step policy is actually implemented in operation of the ego vehicle, such as in implementations in which a planning horizon of the simulations is greater than the time between consecutive election cycles. Additionally or alternatively, in implementations, a multi-step policy might actually be implemented—at least in part—as one or more single-step policies, such as at times at which any or all of the multi-step policy has already been implemented and/or is no longer relevant. Further additionally or alternatively, in implementations, a multi-step policy might actually be implemented—at least in part—as the multi-step policy initially, then as a modified version of the multi-step policy, and then as one or more single-step policies.

Any or all of the trigger conditions associated with a selected multi-step policy can optionally be triggered only in the simulation of the multi-step policy, such as on account of how quickly new policies are evaluated in S140. Additionally or alternatively, in an event that a trigger condition is satisfied within an election cycle (e.g., between consecutive times at which policies are evaluated), the trigger condition and transition between actions of a multi-step policy can be implemented in actual operation of the ego vehicle.

Figures 8A, 8B:
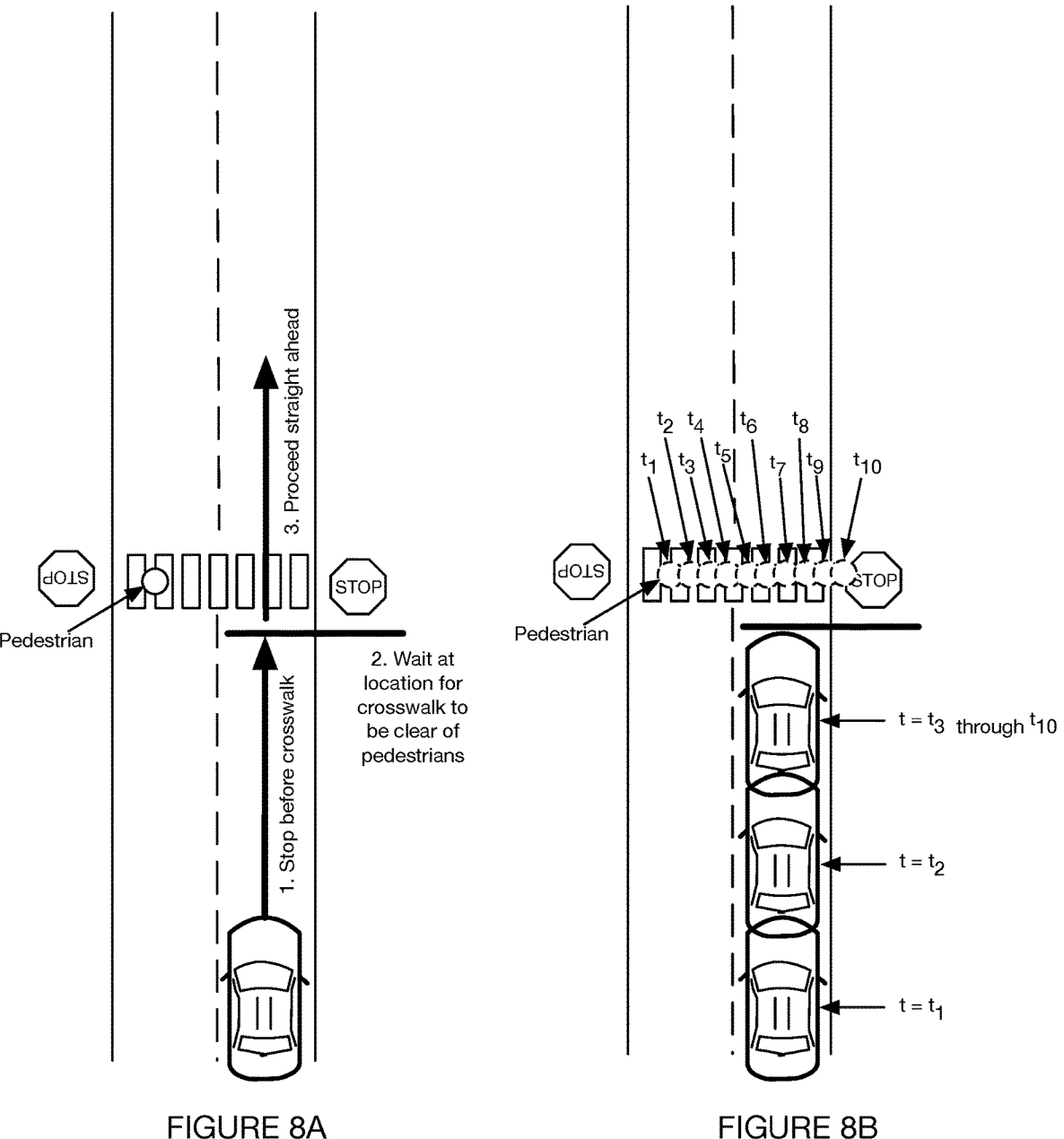
Figure 8C:
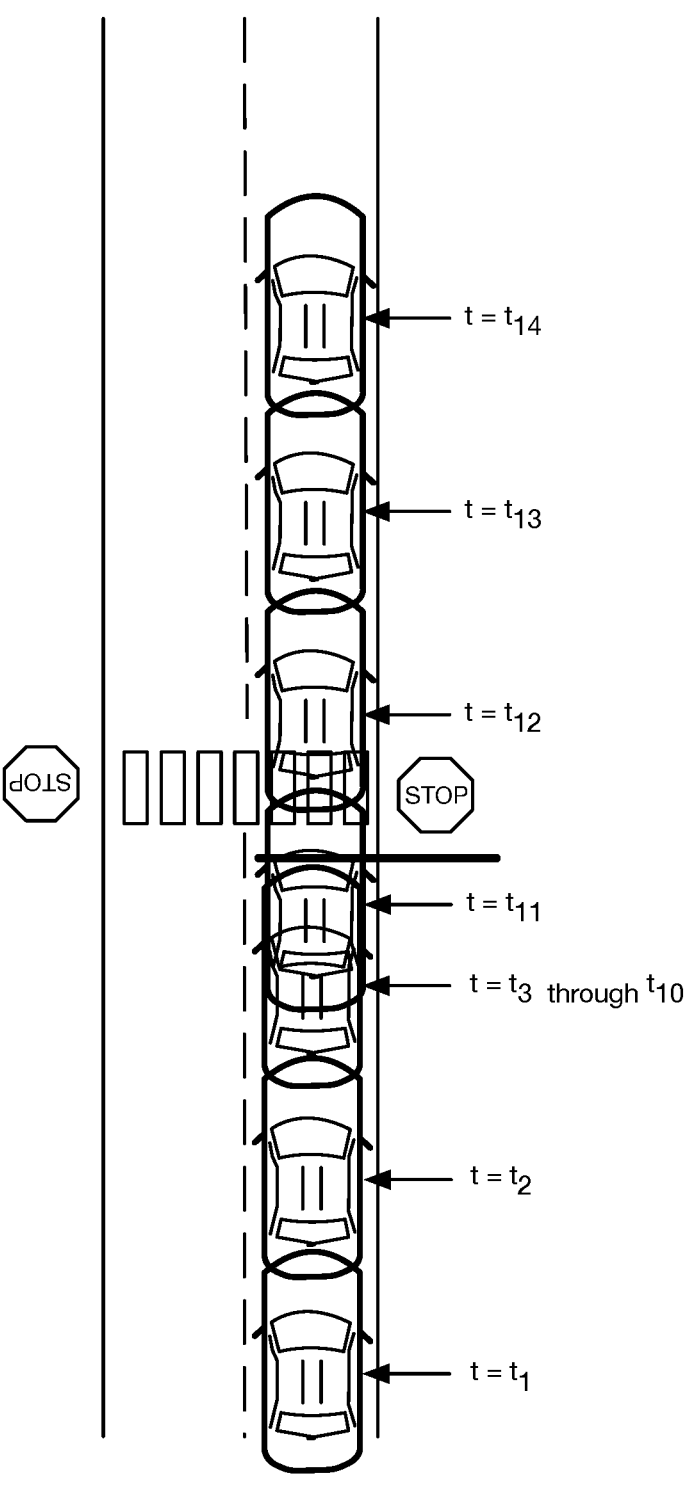
Figure 8D:
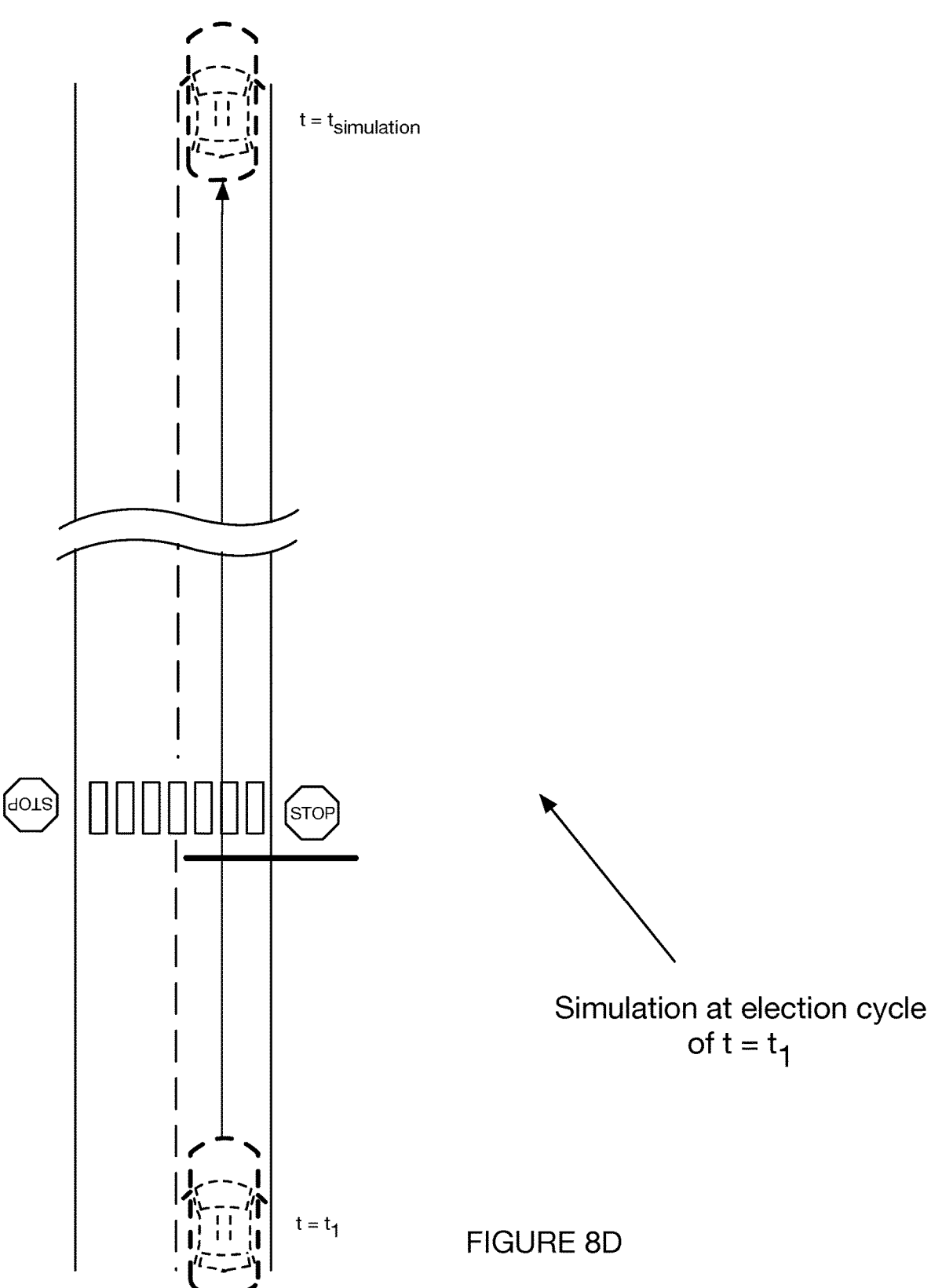

In a variation shown in FIGS. 8A-8F, an ego vehicle is shown at various times and associated locations in its environment during real-life operation in FIGS. 8A-8C (represented as the ego vehicle having a solid outline). As the vehicle approaches a crosswalk, a multi-step policy including Actions 1, 2, and 3 and associated trigger conditions between Actions 1 and 2 and between Actions 2 and 3 is considered for implementation through a set of simulations performed at $t_1$ (e.g., as shown in FIG. 8D where the simulated ego vehicle is indicated as having a dashed outline). During the simulation of this multi-step policy, the vehicle is shown to execute the portion of the multi-step policy that occurs over the duration of the simulation planning horizon, which can then be evaluated (e.g., through a set of metrics, through a score, etc.) and compared with evaluations of other potential policies. This process is then repeated at times $t_2$ through $t_{14}$ (e.g., according to a predetermined election cycle), wherein this multi-step policy can optionally be considered at each of these times. Additionally or alternatively, single-step actions—such as those that represent the individual actions in the multi-step policy—can be considered, modified versions of the multi-step policy (e.g., including only Actions 2 and 3 at times at which Action 1 has already been completed and/or is no longer relevant, including Actions 2 and 3 at all times, etc.) can be considered, other predetermined (e.g., baseline) policies can be considered, and/or any other policies can be considered.

In a specific example of selected policies actually implemented (e.g., which match what is simulated) as a result of these simulations, as shown in FIG. 8E, the ego vehicle: first implements the relevant portions of the multi-step policy including Actions 1, 2, and 3 at times $t_1$ and $t_2$; then implements a single-step policy corresponding to Action 2 at times $t_3$ through $t_{10}$; and finally implements a single-step policy corresponding to Action 3 at times $t_{11}$ through $t_{14}$.

In a specific example of selected policies actually implemented (e.g., which match what is simulated) as a result of these simulations, as shown in FIG. 8F, the ego vehicle: first implements the relevant portions of the multi-step policy including Actions 1, 2, and 3 at times $t_1$ and $t_2$; then implements a multi-step policy including Actions 2 and 3 at times $t_3$ through $t_{10}$; and finally implements a single-step policy corresponding to Action 3 at times $t_{11}$ through $t_{14}$.

Additionally or alternatively, the ego vehicle can otherwise suitably implement any other policies.

4.6 Method—Repeating any or all Processes

The method can optionally include repeating any or all of the above processes, such as any or all of: continuously collecting new inputs in Silo; checking for a new scenario and/or seeing if the current scenario has changed based on a repeated iteration of S120; repeating the determination of a new set of policy options in S130 (e.g., according to an election cycle); selecting a new policy in S140 (e.g., according to the election cycle); continuously operating the ego agent S150; and/or any other processes repeated in any suitable way(s).

In some variations, the method includes using results from previously performed simulations, and/or previously implemented policies, to inform the performance of future simulations and/or the crafting and selection of future policies.

Additionally or alternatively, the method can be otherwise suitably performed.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-public transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-public transitory computer readable media, or any suitable device. The computer-executable component can include a computing system and/or processing system (e.g., including one or more collocated or distributed, remote or local processors) connected to the non-public transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

We claim:

1. A method for operating an autonomous vehicle, the method comprising:
   determining a set of policies for evaluation by the autonomous vehicle, the set of policies comprising:
   a set of multiple action policies, wherein each of the set of multiple action policies prescribes:
   a set of multiple actions; and
   a set of trigger conditions associated with transitions between consecutive actions of the set of multiple actions;
   selecting a policy from the set of policies for implementation by the autonomous vehicle, wherein the selected policy is a multiple action policy of the set of multiple action policies; and
   operating the autonomous vehicle according to the selected policy, comprising implementing a first action of the set of multiple actions of the selected policy.

2. The method of claim 1, wherein the set of policies further comprises a set of single action policies.

3. The method of claim 1, wherein selecting the policy comprises calculating a set of metrics associated with the set of policies, wherein the set of metrics is determined based at least in part on a set of predicted movements associated with a set of tracked agents in an environment of the autonomous vehicle.

4. The method of claim 3, wherein the set of predicted movements is produced based on performing a set of simulations associated with the set of policies.

5. The method of claim 1, wherein operating the autonomous vehicle according to the selected policy further comprises:
   checking for satisfaction of a first trigger condition of the set of trigger conditions; and
   in an event that the first trigger condition is satisfied, operating the autonomous vehicle according to a second action of the set of multiple actions of the selected policy.

6. The method of claim 1, wherein at least a portion of the set of multiple action policies is determined based on a location of the autonomous vehicle.

7. The method of claim 6, wherein the portion of the set of multiple action policies is determined based on referencing a labeled map based on the location.

8. The method of claim 6, wherein at least a second portion of the set of multiple action policies is determined absent of the location.

9. The method of claim 1, wherein at least a portion of the set of multiple action policies is predetermined.

10. The method of claim 1, wherein at least a portion of the set of multiple action policies is determined based on a scenario detected by the autonomous vehicle, the scenario comprising at least one of: a crosswalk, an intersection, or a parking lot.

11. The method of claim 1, wherein evaluating each of the first set of policies comprises performing a simulation for the policy, wherein evaluating the first set of policies is performed based on a set of metrics produced based on a set of outcomes occurring in the set of simulations.

12. A method for operating an autonomous vehicle, the method comprising:

determining a first set of policies for evaluation by the autonomous vehicle, the first set of policies comprising a set of multiple action policies, wherein each of the set of multiple action policies prescribes:

a set of multiple actions; and a set of trigger conditions associated with the set of multiple actions;

evaluating each of the first set of policies to select a first policy from the first set of policies for implementation by the autonomous vehicle, wherein the first policy is a multiple action policy of the set of multiple action policies;

operating the autonomous vehicle according to a first action of the first policy;

while the autonomous vehicle is being operated according to the first action:

determining a second set of policies for evaluation by the autonomous vehicle;

evaluating the second set of policies to produce a second set of metrics;

based on evaluating the second set of policies, selecting a second policy, the second policy separate and distinct from a second action of the first policy.

13. The method of claim 12, wherein the first set of policies for evaluation further comprises a set of single action policies.

14. The method of claim 12, wherein the set of trigger conditions is further associated with transitions between consecutive actions of the set of multiple actions.

15. The method of claim 11, wherein performing the simulation for each of the set of multiple action policies comprises monitoring for a first trigger condition of the set of triggering conditions in the multiple action policy being simulated.

16. The method of claim 15, wherein performing the simulation further comprises transitioning to simulating a second action of the multiple action policy in response to the first trigger condition being satisfied.

17. The method of claim 11, wherein the second set of policies is evaluated according to a predetermined election cycle period.

18. The method of claim 17, wherein the predetermined election cycle period is shorter in duration than a duration of time simulated in each of the set of simulations.

19. The method of claim 11, wherein performing a simulation of the set of simulations for the first policy comprises implementing a trigger condition in response simulating the autonomous vehicle following a right-of-way driving convention relative to a set of tracked agents in the simulation.

20. The method of claim 12, wherein operating the autonomous vehicle according to the first action comprises monitoring for a first trigger condition of the set of trigger conditions.

* * * * *